United States Patent [19]
Weres et al.

[11] Patent Number: 5,439,577
[45] Date of Patent: Aug. 8, 1995

[54] ELECTROCHEMICAL DEVICE FOR GENERATING HYDROXYL FREE RADICALS AND OXIDIZING CHEMICAL SUBSTANCES DISSOLVED IN WATER

[76] Inventors: Oleh Weres, P.O. Box 116, Vineburg, Calif. 95487; Michael R. Hoffman, 1625 Laurel St., South Pasadena, Calif. 91030

[21] Appl. No.: 337,288

[22] Filed: Nov. 10, 1994

Related U.S. Application Data

[63] Continuation-in-part of Ser. No. 213,980, Mar. 16, 1994, Pat. No. 5,364,508.

[51] Int. Cl.6 .................. C02F 1/461; C02F 1/467
[52] U.S. Cl. .................. 204/268; 204/270; 204/278; 204/284; 204/290 F
[58] Field of Search .............. 204/268, 270, 278, 284, 204/290 F

[56] References Cited

U.S. PATENT DOCUMENTS 4,676,878 1/1987 Chez .................. 204/101

*Primary Examiner*—John Niebling
*Assistant Examiner*—Arun S. Phasge
*Attorney, Agent, or Firm*—Harold D. Messner

[57] ABSTRACT

This invention provides an electrochemical water treatment device for producing hydroxyl free radicals and decomposing by oxidation chemical substances dissolved in water. It utilizes a novel electrode which is capable of operation at sufficiently positive anodic potential to produce hydroxyl radicals.

19 Claims, 11 Drawing Sheets

ELECTROCHEMICAL DEVICE FOR GENERATING HYDROXYL FREE RADICALS AND OXIDIZING CHEMICAL SUBSTANCES DISSOLVED IN WATER

This application is a continuation-in-part of application Ser. No. 08/213,980, filed Mar. 16, 1994, titled "Electrochemical Process and Device for Generating Hydroxyl Free Radicals and Oxidizing Chemical Substances Dissolved in Water" now U.S. Pat. No. 5,364,508 issued Nov. 15, 1994.

REFERENCES CITED
US Patent Documents

| | | |
|---|---|---|
| 3,948,751 | 4/1976 | Bianchi et al. |
| 4,003,817 | 1/1977 | Bianchi et al. |
| 4,110,180 | 8/1978 | Nidola et al. |
| 4,676,878 | 1/1987 | Chez |
| 5,364,508 | 11/1994 | Weres et al. |

Other Publications

M. S. E. Abdo and R. S. Al-Ameeri. *J. Envir. Sci. Health*, A22, 27–45 (1987).

G. V. Buxton, C. L. Greenstock, W. P. Helman and A. B. Ross. *J. Phys. Chem. Ref. Data*, 17, 513–759 (1988).

R. N. Gedye, Y. N. Sadana, A. C. E. Edmonds and M. L. Langlois. *J. Appl. Electrochem.* 17, 731–736 (1987).

U. K. Kläning, K. Sehested, and J. Holcman. *J. Phys. Chem.* 89, 760–763 (1985).

C. Kormann, D. W. Bahnemann, and M. R. Hoffmann. *Envir. Sci. Technology*, 25, 494–500 (1991).

A. T. Kuhn, pp. 98–130 in J. O'M. Bockris, Ed., *Electrochemistry for a cleaner environment*, Plenum Press (New York, 1971).

A. T. Kuhn. *J. Appl. Chem. Biotechnol.* 21, 29–33 (1971a).

L. Marincic and F. B. Leitz. *J. Appl. Electrochem.* 8, 333–345 (1978).

R. N. Noufi, P. A. Kohl, S. N. Frank and A. J. Bard. *J. Electrochem. Soc.* 125, 246–252 (1978).

H. A. Schwartz and R. W. Dodson. *J. Phys. Chem.*, 88, 3643–3647 (1984).

BACKGROUND OF THE INVENTION

1. Field of Invention

The present invention provides a water purification device utilizing electrochemically generated hydroxyl free radicals.

2. Related Patent Applications

The electrodes and electrochemical cells utilized in this water purification device and a method for producing said electrodes are provided in the related US Patent Application titled "Electrode, Electrode Manufacturing Process, and Electrochemical Cell", Ser. No. 08/194,727, filed Feb. 10, 1994 by the same inventors. These electrodes include a titanium metal substrate with an oxide coating comprised of titanium dioxide that is doped with niobium or tantalum, wherein the mole fraction of niobium or tantalum in the +4 valence state relative to total metal is 0.25 percent or greater.

The above identified related patent application Ser. No. 08/194,727 is hereby incorporated by reference.

3. Discussion of Prior Art

Electrochemical methods are sometimes used to remove or decompose chemical impurities in water. For example, cathodic reduction is used to remove heavy metal ions including copper, nickel, and silver (Kuhn 1971). Anodic oxidation may be used to destroy cyanide and phenols (Kuhn 1971a), ammonia (Marincic and Leitz 1978), and organic dyes (Abdo and Al-Ameeri 1987). All of these applications involve very specific anodic reactions involving very specific substrates that occur at moderate anodic potentials far below the potential required to generate hydroxyl. Only partial oxidation of the target substrate is achieved. Undesirable byproducts may be formed; for example, electrolytic oxidation of phenol may produce some amount of chlorophenol, an even more objectionable water pollutant. No prior art recited above is able to completely oxidize organic substrates, nor oxidize in a nonspecific manner a wide variety of chemical substances dissolved in water.

An electrochemical method involving the generation of $NO_3$ radicals in a medium containing nitric acid has been reported (Gedye and others 1987). The free radicals produced react with dissolved organic compounds and destroy them. This reaction requires a high concentration of nitric acid, and the electrolyte solution is highly corrosive. It is therefore practically limited to destroying organic compounds dissolved in strong acid solutions.

Hydroxyl free radical is a very powerful, nonspecific oxidizing species which attacks most organic molecules as well as oxidizable inorganic molecules and ions (Buxton and others, 1988). Hydroxyl free radical is produced by irradiation with ultraviolet light of particles of titanium dioxide dispersed in water (Kormann and others, 1991), and hydroxyl thus produced reacts with and degrades organic substances in solution. The hydroxyl radicals produced by the photochemical reaction are believed to be bound to the surface of the $TiO_2$ particles (S.OH), and the oxidation of the substrate occurs at the surface (same ref.). The photochemical method remains largely a laboratory curiosity, because sunlight contains only a small fraction of usable UV energy, and the photochemical method has a small quantum yield. In the laboratory, hydroxyl is produced by reaction of hydrogen peroxide with iron salts dissolved in mildly acidic solution, called Fenton's Reaction.

CHEZ, U.S. Pat. 4,676,878 described the electrochemical production of hydroxyl free radical utilizing electrodes with various semiconducting surface compositions. Chez teaches that at least 12.6 volts must be applied to power the electrochemical cell, which he describes as consisting of a single anode, a single cathode, and aqueous electrolyte solution between them; that is, a unit cell. In reference to five of his seven Examples, Chez stated that 14.5 volts was applied to the unit cell, and in reference to two of his examples he stated that current density averaged 0.0025 amperes per square inch $=0.4$ mA cm$^{-2}$. Chez did not report anode potential, but at this current density the cathode potential would have been between 0 and $-2$ volts; therefore, in Chez's Examples $V_{cell}=14.5$ V corresponds to $E_{anode}=12.5-14.5$ V vs. NHE, and the 12.6 V unit cell voltage that Chez teaches is necessary to produce hydroxyl free radical corresponds to $E_{anode}=10.6-12.6$ V vs. NHE. Chez also teaches that the part of the surface of the anode whereupon hydroxyl free radicals are generated should be coated with a p-type semiconductor.

BIANCHI, U.S. Pat. Nos. 3,948,751 and 4,003,817 has described electrodes wherein a titanium metal base is covered with an oxide coating which contains titanium dioxide, a large proportion of a platinum group metal, and in some examples also niobium or tantalum. The electrode preparation methods described by Bianchi involve brushing on to a titanium metal substrate a solution which contains compounds of the metals desired in the oxide coating, and then heating the electrode in air to evaporate and thermally decompose the coating solution and produced the desired oxide coating.

The electrodes described by Bianchi cannot be operatively combined with Chez to produce hydroxyl free radicals. The platinum group metals in the oxide coating will catalyze the electrolysis of water to molecular oxygen at a value of anode potential much less than that required to produce hydroxyl free radical. If such an electrode is polarized to a potential large enough, in principle, to produce hydroxyl free radicals, it will produce abundant oxygen bubbles, but little or no hydroxyl free radical.

Bianchi also mentions as a ramification the possibility of producing an electrode wherein a titanium metal base is covered with an oxide coating consisting of titanium dioxide doped with either niobium or tantalum, but no platinum group metal. Bianchi apparently did not implement this possibility, because his examples do not include electrodes which correspond to this description. The reason this possibility was not implemented by Bianchi is that the resulting electrodes would be inoperative due to low electrical conductivity of the oxide coating resulting.

It is essential that at least part of the Nb or Ta in the oxide coating be in the $+4$ valence state, because the single valence electron remaining in $Nb^{+4}$ or $Ta^{+4}$ provides the n-type doping which imparts useful electrical conductivity to the oxide coating. In the electrodes disclosed in the above identified Related Patent Application hereby incorporated by reference, Nb or Ta in the oxide coating is converted to the $+4$ valence state by annealing the coated electrodes under hydrogen containing a small amount of water vapor, and this annealing process imparts useful conductivity to the electrodes.

NIDOLA, U.S. Pat. No. 4,110,180 describes electrodes comprising a Ti-metal substrate with an oxide coating that includes titanium dioxide and a platinum group metal oxide (ruthenium dioxide in Nidola's examples), wherein the Ti-metal substrate is alloyed with up to ten percent Nb or Ta. The presence of the platinum group metal oxide makes Nidola's electrodes inoperable for production of hydroxyl free radicals, and the Nb or Ta in the electrode is in the Ti-metal substrate, not in the oxide coating.

In WERES et al., U.S. Pat. No. 5,364,508 we have demonstrated that hydroxyl free radicals can be produced and organic substances dissolved in water can be oxidized at $E_{anode}$ less than four volts vs. NHE, a finding that is surprising and unexpected in light of Chez's teachings. We have further demonstrated that some organic compounds dissolved in water can be oxidized by surface bound hydroxyl free radicals at the surface of the anode at $E_{anode}$ less than two volts vs. NHE. We have demonstrated the operability of these methods at current densities much higher than disclosed by Chez. We have further found that operating our anodes in the range of anode potential taught by Chez damages them.

The possibility of generating hydroxyl free radical by the oxidation of water or hydroxide ion at the surface of an anode is not obvious, because most electrode materials are sufficiently electrocatalytic to oxidize water and generate oxygen at an electrode potential far below that required to generate hydroxyl. For example, conventional titanium anodes are doped with platinum group metals to catalyze the evolution of oxygen, thereby allowing them to operate at a potential not much greater than that required to generate molecular oxygen, which is equal to 1.19–0.0592 pH volts at room temperature. Doping with niobium or tantalum has no such effect. In addition, most electrode materials, including nearly all metallic compositions, will corrode severely when exposed to a positive potential large enough to generate hydroxyl free radical. Because of their composition, our anodes provide a good yield of hydroxyl free radicals and do not corrode when operated at a potential positive enough to generate hydroxyl free radical.

OBJECTS AND ADVANTAGES

In the above identified Related Patent Application, we have disclosed an electrode which is capable of operating at a potential sufficiently positive to produce hydroxyl free radicals and release them to aqueous solution. The electrodes include a titanium or titanium alloy substrate, with a coating of crystalline titanium dioxide doped with either niobium or tantalum in the $+4$ valence state. Useful conductivity is imparted to the electrode when the mole fraction of the additive metal is in the range of 0.25 to 25 percent and the additive metal is predominantly in the $+4$ valence state, and the preferred composition range is 2 to 6 mole percent.

Organic molecules which contain aromatic rings and carbon-carbon double bonds are preferentially attacked by hydroxyl free radical in reactions which destroy the aromatic ring or the double bond (Buxton and others, 1988). This means that highly undesirable aromatic compounds that are sometimes formed by electrolysis or combustion, for example chlorophenol or tetrachlorodibenzodioxin ("dioxin"), would be preferentially attacked by hydroxyl, and therefore cannot be produced by this method.

We have demonstrated the electrolytic destruction of several organic compounds, including an herbicide and an insecticide, toluene, cresol, and a fluoroalkyl foaming agent, and have defined the process conditions advantageous to the method and described a practical device for operating the method.

We have successfully operated the method to oxidize organic compounds in water that has been rendered conductive by adding sodium bicarbonate to it, with the pH of the electrolyte solution controlled by bubbling air containing carbon dioxide through it. Sodium bicarbonate is an entirely innocuous chemical, and carbon dioxide is an innocuous product of the oxidation reaction. No other electrolytic method is able to nonselectively oxidize many organic compounds under these mild conditions.

Hydroxyl free radical is the most powerful oxidizing agent that can exist in an aqueous medium; any stronger oxidizing agent (for example, an oxygen atom) will oxidize water to make HO.(aq). Therefore, it may be said that we have invented the most powerful oxidizing process possible for destruction of organic contaminants dissolved or dispersed in water.

The method disclosed is especially appropriate for destroying small amounts of highly toxic organic compounds dissolved or dispersed in water. An important potential application related to agriculture is to destroy insecticides or herbicides dissolved in water; for example, left over spray solution, or water used to rinse storage containers or spraying equipment. Another important application related to the production and refining of petroleum is to destroy small concentrations of aromatic hydrocarbons and phenols dissolved in water. All other methods available for these applications are more complex, more expensive, produce solid waste, or produce air pollution.

Water soluble sulfur containing ions and other oxidizable inorganic species may also be destroyed using this method.

Herein we disclose electrochemical devices and apparatus for purification of water utilizing said electrochemical method for generation of hydroxyl free radicals, which incorporates said electrodes disclosed in the above identified related application.

DESCRIPTION OF THE INVENTION

The present invention provides a water purification device including coated electrodes that are described in the above identified related patent application, which utilizes the electrochemical process for generating hydroxyl free radicals and oxidizing substances dissolved in water described by WERES et al. U.S. Pat. No. 5,364,508.

DESCRIPTION OF THE INVENTION

Definitions

"Additive metal" refers to Nb or Ta or some combination thereof present in the oxide coating of our electrodes as $NbO_2$ or $TaO_2$.

"Anneal" or "hydrogen anneal" refers to the final step in producing the electrodes, wherein the electrode is heated at a temperature between 600° and 1000° C. in an atmosphere of hydrogen which includes a sufficient amount of water vapor to prevent hydrogen embrittlement or hydriding of the Ti-metal substrate.

"Anode" is an electrode to which positive voltage is applied, including the face of a bipolar electrode that is serving as an anode at a given time.

"Anode potential" is the electrode potential of an anode.

"Aqueous hydroxyl free radical" or HO.(aq) is a hydroxyl free radical free to diffuse through the aqueous medium and not bound to the surface of the electrode.

"Array" or "electrode array" refers to the physical assembly including bipolar electrodes inside a bipolar cell.

"Battery" refers to a group of unit electrochemical cells in series with a break-out electrode at either end. The voltage required to power the battery will equal the unit cell voltage $V_{cell}$ multiplied by the number of unit cells in the battery, while the current drawn by the battery will equal the current through each individual unit cell.

"Bicarbonate buffer" refers to 0.2M $NaHCO_3$ solution saturated with air containing 6 percent carbon dioxide, with pH=8.0 at 25° and pH=8.9 at 90° C.

"Bipolar cell" includes a multiplicity of bipolar electrodes assembled in an array, with current flow through the bipolar cell perpendicular to the bipolar electrodes and through them. Electric power is provided to two or more break-out electrodes within the array of bipolar electrodes, defining one or more electrochemical batteries within the array. Specific embodiments of a bipolar cell are depicted in FIGS. 4 and 10. A bipolar cell is preferably powered by periodically reversed current, whereby each face of each bipolar electrode in the cell alternates between serving as an anode and serving as a cathode.

"Bipolar electrode" is a planar electrode wherein one surface serves as an anode, and the other surface serves as a cathode.

"Cathode" is an electrode to which negative voltage is applied, including the face of a bipolar electrode that is serving as an cathode at a given time.

"Class I electrodes" conduct very little current when $E_{anode}$ is less than the minimum turn-on potential required to generate HO.(aq), and i increases rapidly when $E_{anode}$ exceeds this value, indicating that production of HO.(aq) is the major electrode reaction.

"Class II electrodes" begin to conduct current up to 0.5 volts below the minimum turn-on potential for producing HO.(aq), and i increases smoothly as $E_{anode}$ is increased beyond the turn-on potential, indicating that both HO.(aq) and S.OH are being produced.

"Current density" i is the electrical current passing through part of an electrode, divided by the surface area of that part, measured in amperes per square centimeter.

"Current limited regime" describes the situation wherein the rate of reaction is limited by the current density "Diffusion limited regime" describes the situation wherein the rate of reaction is limited by the rate of diffusion of substrate molecules toward the surface of the anode.

"$E_{HO,aq}$" is the equilibrium half-cell potential for production of HO.(aq) given by eqn. (2).

"$E^O_{HO,aq}$" is the standard half-cell potential for production of HO.(aq), eqn. (1); that is, when pH=log $h_0$=0.

"$E_{max}$" is the maximum anodic potential at which the electrode may be operated without fear of permanent damage.

"$E_{O2/H2O}$" is the half-cell potential for reduction of oxygen, given by eqn. (9).

"$E_{min}$" is the minimum value of anode potential required to generate S.OH given by eqn. (8).

"$E_{TO,bicarb}$" is the approximate value of turn-on potential in the bicarbonate buffer solution, given by eqn. (5).

"Electrically conductive aqueous medium" is the aqueous solution in the electrochemical cell, which contains dissolved electrolytes in concentration adequate to provide the electrical conductivity required for operation of the water treatment device, and may also contain dissolved or dispersed oxidizable substances. In a water treatment device, the "electrically conductive aqueous medium" will be the water being purified, with electrolyte added to it if needed to provide a predetermined value of electrical conductivity favorable to operation of the water treatment device.

"Electrochemical cell" or simply "cell" comprises one or more anodes, one or more cathodes, and an aqueous electrolyte solution is present between adjacent anodes and cathodes. This is the common technical usage of "electrochemical cell". An "electrochemical cell" in this usage may include several "unit electrochemical cells", in series, and then the overall "cell voltage" will be a multiple of the "unit cell voltage". An "electrochemical cell" may also contain two or more "batteries" in parallel.

"Electrode" is a term that includes both "anode" and "cathode". If alternating current is used, the same electrode may alternate between serving as an anode and a cathode.

"Electrode potential" is the potential relative to the Normal Hydrogen Electrode (NHE).

"Electrolyte" is sodium bicarbonate or another water soluble salt added to the water being treated to provide the electrical conductivity required for proper operation of the water treatment device, or which may be present in the water to start with.

"Electrolyte solution" is used with the same meaning as "electrically conductive aqueous medium".

"Gas separation means" refers to the cyclonic gas-liquid separator depicted in FIG. 4 or other appropriate means to remove dispersed or entrained gas bubbles from the water.

"$h_0$" is the concentration of HO.(aq) immediately adjacent to the surface of the anode in moles/L.

"HO.(aq)" is "aqueous hydroxyl free radical".

"Half-cell potentials" are always quoted as reduction potentials, whether a reduction reaction or an oxidation reaction is being discussed.

"Hydroxyl free radical" includes "surface bound hydroxyl free radical" as well as "aqueous hydroxyl free radical".

"i" is "current density".

"Internal part": see "surface part".

"Mole fraction of additive metal" or simply "mole fraction" is the mole fraction of (Nb+Ta) relative to total moles of metal in the oxide coating expressed as a percentage:

$$\text{mole fraction} = 100\% \times (Nb+Ta)/(Ti+Nb+Ta+\text{other metals})$$

"Mole fraction of additive metal in the +4 valence state relative to total metal" in the oxide coating $$= 100\% \times (Nb+Ta)/(Ti+Nb+Ta+\text{other metals})$$

The numerator is the number of moles of $Nb^{+4}+Ta^{+4}$ in the +4 state only, while the denominator includes the number of moles of all metals in the oxide coating, regardless of valence state.

"Organic substances" include organic compounds, organic free radicals, and organic ions.

"Oxidize" includes the decomposition and destruction of chemical substances by means of oxidation reactions, as well as oxidation reactions intended to effect a specific chemical transformation. The specific reactions of hydroxyl free radical include (a) abstraction of hydrogen atoms, (b) extraction of electrons, and (c) addition of hydroxyl to a double bond or aromatic ring, all of which are properly considered to be oxidation reactions.

"pH" is minus the decimal logarithm of the hydrogen ion activity in the electrolyte solution in said electrochemical cell.

"Platinum group metals" are Ru, Rh, Pd, Os, Ir, and Pt.

"Porous anode", is comprised of a metallic substrate formed of Ti-metal fibers or particles, which may be sintered or welded or otherwise fused at their contact points to produce a porous and permeable, but physically coherent and electrically conductive structure, and said metallic substrate is coated with an oxide coating of appropriate composition. In another embodiment, the porous anode includes continuous fibers or fine wires of Ti coated with an oxide coating of appropriate composition, further provided with electrical connecting means that convey electric power to said oxide coated fibers.

"Pressurizing means" refers to a pump or other device that increases the pressure of the water entering the water treatment module to allow operation at pressure above atmospheric, or it may be a connection to a source of water under pressure or pressurized gas which increases the operating pressure of the water treatment module. In the case of a water purification device connected to a water supply pipe, the normal pressure of the water supply may constitute adequate "pressurizing means".

"S" represents the surface of the electrode.

"S—OH" represent an hydroxide ion, $HO^-$, bound to the surface of the electrode.

"S.OH": see "surface bound hydroxyl free radical".

"Semiconducting" is used to describe both lightly doped and very heavily doped metal oxide compositions, which behave as degenerate semiconductors.

"Semiconducting metal oxide composition" refers to the composition of the oxide coating of the anode or, if the anode is a solid body of uniform composition, to the composition of the anode.

"Substrate" is the organic or inorganic chemical species dissolved in water which is oxidized by reaction with hydroxyl free radicals.

"Surface bound hydroxyl free radical" or S.OH is a hydroxyl free radical that is bound to the surface of the anode or another similar free radical species bound to the surface of the anode; for example, oxide radical ion $.O^-$ bound to the surface of the anode.

"Surface part" refers to a part of the anode in contact with the electrically conductive aqueous medium. If the anode is comprised of a metallic substrate that is partially or completely covered with a semiconducting metal oxide coating, the oxide coating comprises the "surface part", and the metallic substrate comprises the "internal part". The same definition applies if the anode is a porous anode comprising a fibrous or particulate metallic substrate wherein the fibers are covered with a semiconducting metal oxide coating.

"T" is the absolute temperature in Kelvins.

"Treatment stage" refers to an electrochemical cell, treatment module, or group of electrochemical cells or treatment modules which treat water going through them as part of a larger water treatment device including two or more electrochemical treatment stages; for example, the "Main Treatment Module" in FIG. 1 comprises two treatment stages, and the "Polishing Module" a third treatment stage.

"Turbulence promoting means" refers to a textured pattern in the surface of bipolar electrodes, or a plastic mesh installed between bipolar electrodes, or other means which tend to increase the amount of turbulence in water rapidly flowing between the bipolar electrodes in the bipolar cell.

"Turn-on potential" is the potential of an ideal hydroxyl electrode which behaves consistently with eqn. (3), and may be calculated by estimating and inserting the proper value of $h_0$ into eqn. (3). $h_0$ and turn-on potential are both functions of T, i, and the composition of the electrically conductive aqueous medium. Eqns. (5) and (7) are expressions for the value of turn-on potential ($E_{TO,bacarb}$ and $E_{TO}$) for particular compositions of the electrically conductive aqueous medium and values of i.

"Unit cell voltage" ($V_{cell}$) is the voltage applied to power a unit electrochemical cell consisting of one anode and one cathode with electrolyte solution between them.

"$V_{cell}$"; see "unit cell voltage".

"Water" is in some places used in the sense of "water being treated".

"Water being treated" is used in the sense of "Electrically conductive aqueous medium".

"Water circulation means" refers to the pump that circulates water through a bipolar cell to provide the flow velocity needed to produce the level of turbulence desired.

"Water propulsion means" refers to the pump that drives water through the water treatment device, but may also refer to water supply pressure if the water treatment device is connected to a water supply line, or to other means that may be employed to move water through the water treatment device; for example, gas pressure, or the hydrostatic pressure of water in a tank.

"Water treatment module" refers to an electrochemical cell or group of cells together with auxiliary components which support the operation of those cells; for example, the water circulation pump and gas separator as depicted in FIG. 4, which depicts a particular embodiment of a "water treatment module" that includes a bipolar cell. The precise components included in the treatment module will depend on the particular design of the water treatment device that it forms a part of.

DESCRIPTION OF THE INVENTION

Electrode Reactions

When the anodes described in the above identified related patent application are polarized to a sufficiently high positive potential, water molecules at the surface of the anode will be oxidized, producing hydroxyl free radicals according to the electrochemical reaction $$H_2O(aq) \rightarrow HO.(aq) + e^+ + H^+ \tag{1}$$

where $H_2O(aq)$ and $HO.(aq)$ represent a water molecule and a hydroxyl free radical in the aqueous phase; that is, very near to the surface of the electrode (probably within 1 nm), but not physically bound to it. The anodic potential required to generate hydroxyl free radicals will vary with temperature, pH in the solution, and the concentration of HO. (aq) at the surface of the anode ($h_0$). The Nernst equation describing the half-cell reaction (1) at 25° C. is:

$$E_{HO,aq} = 2.74 + 0.0592 \, (\log h_0 - pH) \tag{2}$$

where the value $E^O_{HO,aq} = 2.74$ is quoted from Kläning and others (1985). (Even though reaction 1 is written as an oxidation reaction, eqn. 2 gives the corresponding half-cell potential as a reduction potential; all half-cell potentials are given as reduction potentials throughout this application.) Employing the method described Schwartz and Dodson (1984) to calculate the temperature dependence of $E^O_{HO,aq}$, we have derived the temperature dependent expression $$E_{HO,aq} = 3.06 - 0.00108\,T + 0.0001984\,T(\log h_0 - pH) \tag{3}$$

where T is the absolute temperature in Kelvins, and the equation holds for 0°–100° C. These expressions for $E_{HO,aq}$ apply only to reaction (1), producing HO.(aq). Eqn. (3) describes an ideal reversible electrode, and does not depend on the composition of the electrode's surface, as long as it behaves as an ideal, reversible electrode in relation to reaction (1). Actual electrodes will operate at somewhat higher potential because of overvoltage effects. Therefore, eqn. (3) describes a theoretical lower limit of the potential required to produce HO.(aq), which we call the "turn-on potential". The discrepancy between a real electrode and the ideal electrode described by eqn. (3) will be small at small current density, and it will increase rapidly with increasing current density. The maximum current density compatible with nearly ideal electrode behavior will increase with the doping level of the electrode.

The concentration of HO.(aq) near the surface of the anode ($h_0$) is a function of current density, which is approximately proportional to the rate of production of HO.(aq), and also a function of the composition of the aqueous medium, because reaction with substances dissolved in the aqueous medium comprises the major sink for HO.(aq). The value of $h_0$ may be calculated to a good approximation using a simple model of coupled diffusion and chemical reaction developed by us, together with rate constants for reactions of HO.(aq) with various substrates presented by Buxton and others (1988). For example, in 0.2M $NaHCO_3$ saturated with air containing 6% $CO_2$ at 25° C., pH=8.0, most of the HO.(aq) will react with bicarbonate ion, and $$\log h_0 = -3 + \log i \tag{4}$$

where $h_0$ is in moles/L and i is in amperes $cm^{-2}$, and the formula for the turn-on potential, given by substituting eqn. (4) and pH=8.0 into eqn. (2) is $$E_{TO,bicarb} = 2.09 + 0.0592 \, \log i \tag{5}$$

Solid line 32 in FIG. 2 was plotted using eqn. 5.

A hydroxyl free radical bound to the surface of the electrode may be produced by oxidation of an hydroxide ion or a water molecule that is adsorbed to the surface of the electrode:

$$S-OH \rightarrow S.OH + e^- \tag{6}$$

where S represents the surface of the electrode. Because the surface bound hydroxyl free radical is stabilized by being bound to the surface, the required anode potential for reaction (6) is smaller than the anode potential required for reaction (1) at equal current density, i.

Reactions (1) and (6) are two distinct, competing reactions that may take place simultaneously at the surface of the anode. The proportion between them will depend on the detailed surface properties of the anode, and upon the anode potential. Reaction (1) can take place only when $E_{anode}$ exceeds the turn-on potential. (The exact value of turn-on potential will, of course, vary with the composition of the electrolyte solution and the temperature.) Above the turn-on potential, the current associated with reaction (1) increases rapidly. Most of the electrodes described in the above identified related patent application exhibit a well-defined turn-on potential in bicarbonate buffer equal to that predicted by eqn. (5) or slightly larger; for example, the three electrodes labeled 28 in FIG. 2. With these electrodes, the current density at $E_{anode} < E_{TO}$ is very small and erratic, indicating that reaction (6) is relatively unimportant. We call these electrodes "Class I electrodes".

The minimum anode potential $E_{min}$ required for reaction (6) is at least 0.5 volts smaller than the turn-on potential for reaction (1), but the current density associated with reaction (6) increases more slowly with increasing anode potential. Some electrodes exhibit a significant, stable, and reproducible current density at $E_{anode} < E_{TO}$, consistent with reaction (6). At $E_{anode} < E_{TO}$ the only free radicals produced are S.OH or similar species, for example, surface bound oxide radical ion S−O., and it is believed that at $E_{anode} > E_{TO}$ reactions (1) and (6) both take place, producing HO.(aq) together with S.OH. We call these electrodes "Class II electrodes"; for example, the curve designated 30 in FIG. 2.

The electrode used to generate plot 30 in FIG. 2 exhibited very pronounced Class II behavior. The oxide coating was doped with 4 mole percent Nb, and the electrode was prepared as described in Example 8 of the above identified related patent application using an aqueous coating slurry. When first tested, it exhibited exhibited moderate Class II behavior, with $i \cong 0.5$ mA cm$^{-2}$ at $E_{TO} = 1.91$ V. The Class II behavior became much more pronounced after it was operated several times in bicarbonate buffer and acetate buffer at 85°–90° C. (curve 30 in FIG. 2).

The extent to which an electrode exhibits Class II behavior depends on how it was made and its history after it was produced. Most of our electrodes fall into Class I, including all electrodes made using organic coating solutions, described in Examples 1, 2 and 3 in the related patent application cited above. It is believed that the difference between Class I behavior and Class II behavior is related to the state of hydration of the surface of the anode; operation at high temperature tends to hydrate the surface, favoring Class II behavior. Class II behavior is also favored by cooling down the electrode under hydrogen after annealing it under hydrogen.

As discussed below, S.OH is not quite as powerful an oxidizing agent as HO.(aq). Whether Class I or Class II behavior is desired will depend on whether or not the particular substrate can be efficiently oxidized by reaction with S.OH. If yes, then a Class II electrode will give abundant reaction at a lower anode potential and energy cost. If no, then a Class I electrode will produce the largest possible amount of HO.(aq) without wasting current to make S.OH.

While we believe that the theoretical explanations presented in this section are correct, we do not wish to be bound by them.

DESCRIPTION OF INVENTION

Operating Limits

FIG. 3 illustrates the limits on operating potential (expressed by eqns. 7, 8, 10a, 10b and 10c) and limits on electrolyte solution pH. FIG. 3 was generated setting T=298.15K (=25° C.) in the equations recited in the claims. These equations were presented and discussed by WERES et al. U.S. Pat. No. 5,364,508.

There is no prior art known to us which teaches oxidation of organic compounds or sulfur compounds dissolved in aqueous media using electrochemically generated HO.(aq) and S.OH within the range of anodic potential and pH specified in FIG. 3, regardless of current density.

Eqn. (7) gives the approximate value of turn-on potential needed to generate sufficient hydroxyl free radical to provide log $h_0 \cong -7$ at the surface of the anode, corresponding to current density $i \cong 0.25$ mamp cm$^{-2}$ at 25° C.:

$$E_{TO} = 3.06 - 0.00247\ T - 0.0001984\ pH\ T \tag{7}$$

Eqn. (8) represents our best estimate of the minimum potential needed to generate surface bound hydroxyl free radicals:

$$E_{min} = 2.06 - 0.00147\ T - 0.0001984\ pH\ T \tag{8}$$

Eqn. (8) plots about 0.4 volts above the equilibrium potential for reduction of hydrogen to water in contact with air:

$$E_{O2/H2O} = 1.48 - 0.00083\ T - 0.0001984\ pH\ T \tag{9}$$

which is represented by the dashed line in FIG. 3.

The relationship between $E_{anode}$ and i depends strongly upon the properties of the anode, and in particular depends upon the degree of n-doping of the semiconducting metal oxide surface composition of the anode. Indeed, the ability to pass a given current at a given potential and pH depends on the composition, level of doping, and other properties of the anode.

At pH 8 and room temperature, applying 3.45 V anodic potential to an electrode wherein the surface composition comprises TiO$_2$ doped with 4 mole percent of Nb$^{+4}$ produces a sustainable current density of 15–50 mA cm$^{-2}$, depending on the detailed preparation and history of the particular electrode. The corresponding unit cell voltage will be in the range 3–8.5 volts, depending upon the pH, temperature and conductivity of the electrically conductive aqueous medium, the geometry of the cell, and the condition of the electrodes. Lower doping levels decrease the current density approximately in proportion, and i also drops off at higher doping levels. Typical results for i vs. $V_{cell}$ and i vs. $E_{anode}$ are presented in FIGS. 7 and 8 of WERES et al. U.S. Pat. No. 5,364,508. In contrast to our electrodes, the electrodes used by Chez conducted about 0.45 mA cm$^{-2}$ at an anode potential that exceeded 10.6 volts, and $V_{cell}$ typically equal to 14.5 volts.

In our work, we usually have not exceeded $E_{anode} = 3.45$ V at pH 8, and we know from experience that an electrode doped at 4 percent Nb$^{+4}$ will operate well up to at least that potential. This value corresponds to the formula $$E_{max} = 4.0 - 0.0001984\ pH\ T \tag{10a}$$

For a given concentration of substrate in solution, increasing i will increase reaction rate only up to a certain point; above a certain value of i, the rate of reaction will be limited by the rate of diffusion of substrate molecules to the surface of the anode. Also, above a certain value of $E_{anode}$ the anode may be damaged. With electrodes doped with 4 four mole percent Nb$^{+4}$, we find that damage is small up to about $E_{anode} = 4.2$ V at pH 8, but the electrodes are severely damaged if polarized to 5.2 V for 10 minutes. $E_{anode} = 4.2$ V at pH 8 corresponds to the formula $$E_{max} = 4.7 - 0.0001984\ pH\ T \tag{10b}$$

Theoretical estimates of electric field strength within the space charge region just inside the surface of the anode, and dielectric strength as a function of doping level indicate that a less highly doped anode may be able to tolerate a higher anode potential without being damaged, albeit with correspondingly smaller current density. Allowing for lower doping levels and future improvements in electrode processing, we estimate that some electrodes will be able to operate without damage up to $$E_{max} = 6.2 - 0.0001984 \, pH \, T \tag{10c}$$

Hydroxyl free radical is a weak acid with $pK_a \cong 11.9$ at 25° C. At pH > 11.9, HO. is converted to its conjugate base the oxide radical ion .O⁻, which is much less reactive than HO.. Also, at high pH Nb and Ta may be leached from the surface of the anode, damaging it. In strongly acid solutions with pH < 2, $TiO_2$ may be attacked by acid, and the electrode will be damaged. For these reasons, we consider the maximum safe operating range for our method to be pH 2 to 12.

The presence of carbonate ions in the electrically conductive aqueous medium is undesirable, because carbonate is an excellent substrate for hydroxyl free radicals, and reaction with carbonate may interfere with more useful reactions. To avoid converting bicarbonate to carbonate ($pk_a \cong 10.2$), it is preferred to operate at pH < 9. Below pH 4, there may be some small degree of corrosion, particularly if fluoride ion is present. To be absolutely safe, it is preferred to operate above pH 4.

While we believe that the theoretical explanations presented in this section are correct, we do not wish to be bound by them.

DESCRIPTION OF INVENTION

Necessary Composition of the Anode

Proper anode surface composition is required for our methods to be operable. Because anode surface composition determines the range of anode potential required and preferred for method operation, anode surface composition has a large affect upon method steps.

All metals will be oxidized at the high anode potentials required to produce HO., and a metallic anode will corrode, or else it will be covered by a protective metal oxide layer of some thickness. Therefore, the choice of surface compositions is restricted to metal oxide compositions.

When polarized to $E_{anode} > E_{min}$, most anode materials will oxidize water to produce molecular oxygen instead of hydroxyl:

$$2 \, H_2O \rightarrow O_2 + 4 \, H^+ + 4 \, e^- \tag{11}$$

Reaction (11) requires a suitably electrocatalytic anode to proceed with moderate overpotential; for example, Pt or $TiO_2$ doped with a Pt group metal oxide. In this case, most of the current will be consumed to produce $O_2$ at a potential less than that required to produce hydroxyl free radicals. While the Pt group metals are the best catalysts for oxidation of water, some other transition metals also favor the reaction, including Fe and Ni. The surface composition of our electrodes was purposely selected to not catalyze reaction (11). Therefore, reactions (1) and (6) predominate when $E_{anode}$ is sufficiently large.

The electrode itself must not be oxidized at the values of potential required to generate HO., other than reversible formation of S.OH or holes in the valence band. The metal ions in the metal oxide composition must not be oxidized at the operating potential, because oxidation of the metal ions will be part of a corrosion process, or will form part of a reaction cycle that oxidizes water to oxygen. This requirement is satisfied by a semiconducting metal oxide composition wherein the metal ion or ions are in their highest valence state, and have an electronic structure with either a filled shell (inert gas structure) or a filled subshell (d or f). If the band-gap of the oxide is too large, even heavy n-doping will fail to impart useful electrical conductivity; this consideration excludes $Al_2O_3$ and $SiO_2$ (which Chez employed) from practical consideration in our preferred range of anode potential.

The semiconducting metal oxide must be doped to provide the electrical conductivity needed to serve as an electrode. p-doping will not do, because the mobility of holes in a metal oxide is small, and they are energetically unstable. n-doping is provided by adding some amount of metal ions in the $+(n_d - 1)$ valence state, where $n_d$ is the maximum valence state of the additive metal. The remaining electron enters the conduction band of the semiconducting metal oxide, providing conductivity. In our electrodes, $TiO_2$ is n-doped with $Nb^{+4}$ or $Ta^{+4}$. Doping with $Nb^{+4}$ results in a composition which is basically $TiO_2$ containing a few percent $NbO_2$ in solid solution. Because $TiO_2$ is extremely resistant to virtually all forms of chemical attack (other than reaction with HF or concentrated mineral acids), the $Nb^{+4}$ in the oxide is well protected from oxidation to $Nb^{+5}$. It should be noted that $NbO_2$ is itself a very inert compound with very low solubility like $TiO_2$, and is oxidized with difficulty, despite the oxidation reaction being thermodynamically favored.

$TiO_2$ may also be doped with $Ti^{+3}$ as reported by Noufi and others, and we have observed that electrodes coated with pure $TiO_2$ and annealed under hydrogen have electrical conductivity due to $Ti^{+3}$ which is comparable to doping with 0.25% $Nb^{+4}$, and similarly generate hydroxyl free radicals when polarized to the appropriate potential. However, the $Ti^{+3}$ ion is accompanied by anion vacancies which are easily filled by oxygen atoms, resulting in oxidation of $Ti^{+3}$ to $Ti^{+4}$ and consequent loss of conductivity. For this reason electrodes doped with $Ti^{+3}$ are inferior to electrodes doped with $Nb^{+4}$.

Finally, the metal oxide must be practically insoluble in water over some useful range of pH, or else the surface of the electrode will dissolve.

The single metal oxides meeting the criteria outlined above are: $TiO_2$, $ZrO_2$, $HfO_2$, $Nb_2O_5$, $Ta_2O_5$, ZnO, $Ga_2O_3$, $In_2O_3$, $GeO_2$, $SnO_2$, $PbO_2$, $CeO_2$ and $ThO_2$. To this list might be added $SrTiO_3$ and other titanates of group IIA metals, $KTaO_3$ and other niobates and tantalates of group IA metals. However, there are no suitable doping elements available for most of these oxides, which are compatible in regard to oxidation potential, ionic radius, solubility in the host oxide, insolubility in water, and absence of catalytic activity in regard to oxidation of water. $TiO_2$ and titanates of group IIA metals doped with $Nb^{+4}$ or $Ta^{+4}$ stand out as excellent combinations in this regard.

Considerations of conductivity, compactness and ruggedness argue that the electrode comprise a metal substrate coated with an oxide layer. Ti-metal coated with TiO$_2$ doped with Nb$^{+4}$ or Ta$^{+4}$ is superior to all other possibilities. The advantages of this combination include the extreme corrosion resistance of Ti, moderate cost and ready availability of Ti, very low cost of TiO$_2$, and the extreme insolubility of NbO$_2$ and TaO$_2$.

Other possible combinations include TiO$_2$ doped with Sb, and SnO$_2$ doped with Sb. The latter material is widely used in applications where an optically transparent semiconducting coating needs to be deposited upon a transparent substrate.

While we believe that the theoretical explanations presented in this section are correct, we do not wish to be bound by them.

DESCRIPTION OF THE INVENTION

Practical Considerations

The concentration of HO.(aq) will usually be limited by fast reaction with potential substrates present in solution; even bicarbonate will react with HO.(aq) if no better substrates are present. If the solution is exceptionally inert (for example, dilute sodium sulfate with no organics present), $h_0$ will be limited by the reactions of hydroxyl radicals with each other to give hydrogen peroxide and then oxygen:

$$2\ HO. \rightarrow H_2O_2 \qquad (12a)$$

$$2\ HO. + H_2O_2 \rightarrow O_2 + 2\ H_2O \qquad (12b)$$

For this reason, the concentration of HO.(aq) present in solution is never large, and decreases very rapidly with distance from the surface of the anode. Theoretical estimates indicate that the concentration of HO.(aq) will practically drop to zero within 1 $\mu$m of the surface of the anode. Therefore, solute molecules must come within 1 micrometer of the anode in order to react with HO.(aq) and be destroyed. Organic molecules oxidized by reaction with S.OH at the surface of the anode must, of course, diffuse to the surface of the anode. In either case, the rate of mass transfer limits the rate of reaction when the concentration of substrate molecules in solution is small. This circumstance is henceforth referred to as "the diffusion limited regime".

If the concentration of the substrate in solution and the rate of mass transfer are large in relation to the current, the "current limited regime" may be attained, wherein the current through the anode determines the overall rate of reaction, and sufficient substrate molecules reach the electrode surface to react with all of the hydroxyl produced at the surface of the anode.

Two configurations of the electrochemical cell have been identified as particularly advantageous for promoting good mass transfer; these are the bipolar electrochemical cell and the porous anode cell depicted in FIGS. 4 and 8. The bipolar cell is provided with means to recirculate the aqueous medium within the cell and to induce turbulence in the flowing water. The porous anode cell has an extremely large anode area and substrate molecules need diffuse a very short distance only to reach the surface of the anode.

An electrolytic water purification method requires that the water to be purified have sufficient electrical conductivity to conduct the necessary current without excessive ohmic losses. It may be necessary to add an innocuous electrolyte to the water in order to increase its conductivity. If the substrate contains the element chlorine, sulfur, nitrogen or phosphorus, the reaction may produce strong acids (hydrochloric, sulfuric, nitric or phosphoric, respectively), and it may be necessary to buffer the electrolyte solution and to add base to neutralize the acid produced.

Adding sodium carbonate to the electrolyte solution is advantageous for the purposes outlined in the preceding paragraph. Reaction of carbonate ion with carbon dioxide produced by the oxidation reaction will convert carbonate ion to bicarbonate. Sodium carbonate is very inexpensive, and the occupational and environmental hazards associated with it are small. The small concentration of sodium bicarbonate remaining in the treated water will not require special treatment or costly disposal.

The arguments for an absolute maximum pH of 12 and a preferred maximum pH of 9 have been presented above. The oxidation of organic compounds dissolved in the water will produce carbon dioxide. The combination of bicarbonate with excess carbon dioxide in solution will buffer the electrolyte solution at a pH value between 7.5 and 9.

Organic acids will be produced as intermediate reaction products in the oxidation of organic compounds, and many of these acids will have pK$_a$ between 4 and 5. By adding the appropriate amount of sodium carbonate to the water, it is an easy matter to buffer the pH of the solution within this range, without the need to recirculate carbon dioxide produced by the reaction, and completely without interference from carbonate or bicarbonate. Operation at lower pH will decrease the overvoltage at the cathode (which generates hydrogen at large values of current density), thereby decreasing V$_{cell}$ and energy cost.

It is desirable to maintain the water in the process near saturation with atmospheric oxygen, in order to allow hydrogen peroxide to be produced at the cathode, and allow reactions with O$_2$ to help degrade the substrate molecules. Saturation with oxygen is most readily accomplished by injecting air or pure oxygen into the water at one or more points within the process. The need to add air must be balanced with the desire to keep an adequate concentration of carbon dioxide dissolved in the water to maintain the pH value desired. This may be accomplished by limiting the volume of air injected and by reusing the air within the water treatment device, so that carbon dioxide in the air is partially returned to the water. Injection of pure oxygen is particularly advantageous, because it does not introduce nitrogen which needs to be vented when air is injected, removing some carbon dioxide with it.

In many applications the water to be treated will contain surfactants, or the oxidation reaction may produce some amount of surfactant materials. For example, pesticide formulations commonly contain surfactants. The electrochemical process will produce gas, including hydrogen generated at the cathode, oxygen generated at the anode, and carbon dioxide produced by the oxidation process itself. Injection of air will further increase the amount of gas in the flowing water. The combination of gas bubbles and surfactants will tend to produce foam which can cause operational problems. Injecting oxygen instead of air will eliminate the nitrogen that air would introduce, and operating the electrochemical cell at elevated pressure will decrease the volume of the gas bubbles produced.

Formation of gas bubbles is particularly undesirable inside a porous anode cell, where the gas bubbles may accumulate and interfere with liquid flow. Because the porous anode cell will normally be operated at low current density to treat water containing a small concentration of oxidizable organic substrates, the amount of hydrogen and carbon dioxide produced will be small. If sufficient oxygen is present in the water in relation to oxidizable organic substrates and the current density at the surface of the cathode is small enough, the reduction of oxygen to hydrogen peroxide may be the predominant cathodic reaction, and no little or no hydrogen will be generated. Also, the amount of carbon dioxide produced will be small because of the small concentration of oxidizable organic substrates in the water. In this case, operation under pressure may completely eliminate formation of gas bubbles within the cell, particularly if the water is saturated with air or oxygen before entering the porous anode cell, which favors depolarization of the cathode by reduction of oxygen. Saturating the water with air or oxygen at elevated pressure will increase the concentration of dissolved oxygen resulting in proportion to the pressure.

Passing a surfactant-rich solution through a bipolar cell may cause formation of finely dispersed gas bubbles in large concentration; we have observed up to about one-third by volume of dispersed gas in the water in extreme cases. Under these extreme conditions the dispersed gas bubbles sensibly increase the electrical resistance of the flowing water, increasing energy costs. When surfactants are absent, the gas bubbles produced will be much larger, and will be removed much more effectively by the cyclonic separator. In some circumstances, the presence of some coarse gas bubbles may be advantageous, because they might increase the amount of turbulence produced in the flowing water, improving mass transfer at the surface of the electrodes.

The water treatment device will be operated to provide a predetermined quality of the treated effluent water. It is desirable to incorporate an automatic effluent quality sensor or monitor in the water treatment device which will continuously monitor the quality of the water leaving the device, and provide the control module and/or the human operator with data that allows the operating set-points of the device to be adjusted if necessary to improve the quality of the effluent, or to eliminate energy-wasting excessive treatment of the water. Ordinarily, the water treatment device will be operated to treat the largest possible flow rate of water consistent with predetermined effluent quality standards.

The correct parameter to monitor will depend on the particular application. For example, if total concentration of aromatic hydrocarbons or phenols is the water quality parameter of concern, absorption of ultraviolet light at about 280 nm wavelength is a sensitive and appropriate indicator of treated water quality. Fluorescence of the treated water when irradiated with UV light may also be appropriate in this case. Operated at fixed wavelength, both of these methods can readily be implemented using a simple and rugged flow-through monitor well-suited for continuous operation. If a pesticide of limited solubility is present in the form of dispersed droplets or bubbles, disappearance of turbidity associated with the dispersed material would be an appropriate parameter to follow. In this case, the turbidity monitor might preferably be installed between the main treatment module and the polishing module (in FIG. 1).

If foaming tendency is the water quality parameter to be controlled, foaming ability of the water would be the obvious parameter to monitor. If foamy water is treated using a bipolar cell provided with a cyclonic gas-liquid separator (FIG. 4), foam will tend to come out the top of the separator. In this case, a foam level detector (optical, electrical, acoustic, mechanical, etc.) installed in the separator stack can provide a signal indicating the foam level, allowing process conditions to be adjusted in response.

If the water quality parameter of concern is not amenable to easy continuous monitoring, an innocuous "tracer" surfactant can be added to the water. If the tracer surfactant is known to be degraded more slowly than the pollutant of concern, destruction of the tracer surfactant (as indicated by stable foam level in the gas-liquid separator) will be good indication that the actual pollutant of concern has also been destroyed.

If total organic carbon (or a related parameter, like COD) is the parameter of concern, a continuous TOC monitor can be used for process control.

The process will consume electrical energy, which will ultimately be converted to sensible heat in the water. If the concentration of organic materials to be oxidized is large, the temperature increase will be large in proportion. At elevated temperature, steam will dilute oxygen and carbon dioxide in the air bubbles, and decrease the concentrations of these gases in solution. It is preferred that the temperature of the water not rise above approximately 90° C., in order to ensure that sufficient oxygen and carbon dioxide remain in the water. Pressurizing the treatment module would increase the solubility of oxygen and carbon dioxide, allowing operation at temperature above 90° C.

In application to pesticide waste, the solubility of the pesticide may be an important controlling factor. Many of these compounds have low solubility in water, and are applied in the form of dispersions of droplets or solid particles in water. The concentration of the substrate dissolved in the water limits the rate at which the substrate will diffuse toward the anode, where it is destroyed. Increasing the temperature of the water will usually increase the solubility of the pesticide, and for this reason it may be preferable to operate the process at the maximum possible temperature, subject to the 90° C. limitation outlined above. If the concentration of substrate is small, the temperature rise in the water will be correspondingly small. In this case, it may be advantageous to use a regenerative heat exchanger to recover heat from the treated water exiting the process and transfer it to the water entering the process. The success of this technique requires a temperature increase large enough to drive the heat exchange process. With appropriate design, a temperature increase of less than 10° C. should suffice. We estimate that pesticides with a room temperature solubility greater than 30 mg/liter can be efficiently destroyed by the process operating at 90° C.

As described in the Specification of WERES et al. U.S. Pat. No. 5,364,508, the value of $V_{cell}$ corresponding to a given current density decreases with increasing temperature. Therefore, operation at elevated temperature decreases the amount of electrical energy consumed. The rate of molecular diffusion increases with temperature, improving the rate of diffusive mass transfer at the surface of the electrodes. Also, the viscosity of water decreases, enhancing turbulence and producing a thinner laminar boundary layer, which also improves mass transfer.

BRIEF DESCRIPTION OF THE DRAWING FIGURES

By way of example, operation and embodiments of the present invention will now be described with reference to the accompanying drawings, of which:

FIG. 1 depicts a water purification device including two or more treatment stages utilizing the methods described by WERES et al. U.S. Pat. No. 5,364,508 and the electrodes disclosed in the related patent application identified above.

Figure 9:
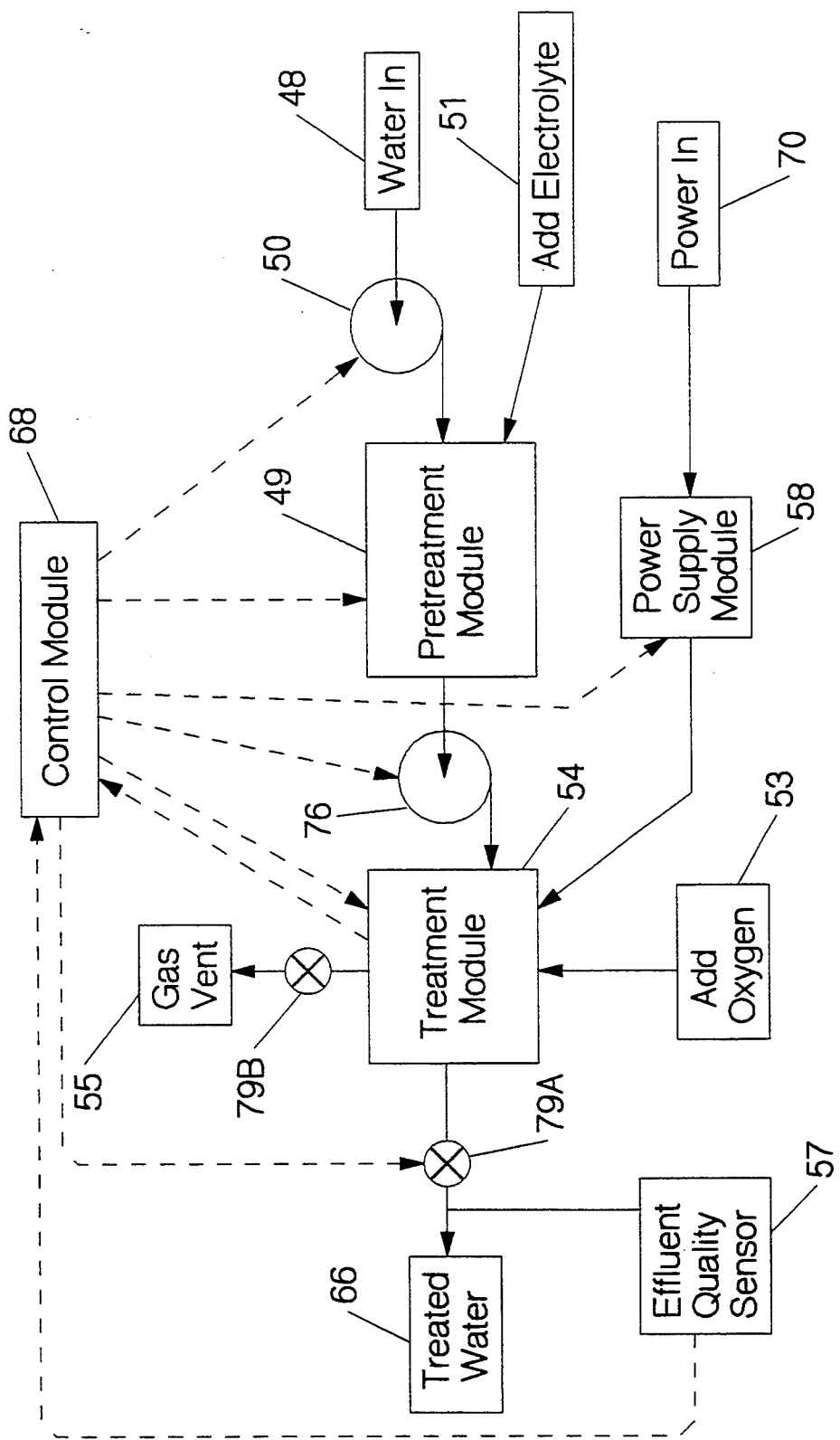

FIG. 9 depicts a water purification device with one treatment stage utilizing the methods described by WERES et al. U.S. Pat. No. 5,364,508 and including the electrodes disclosed in the related patent identification identified above.

Figure 10:
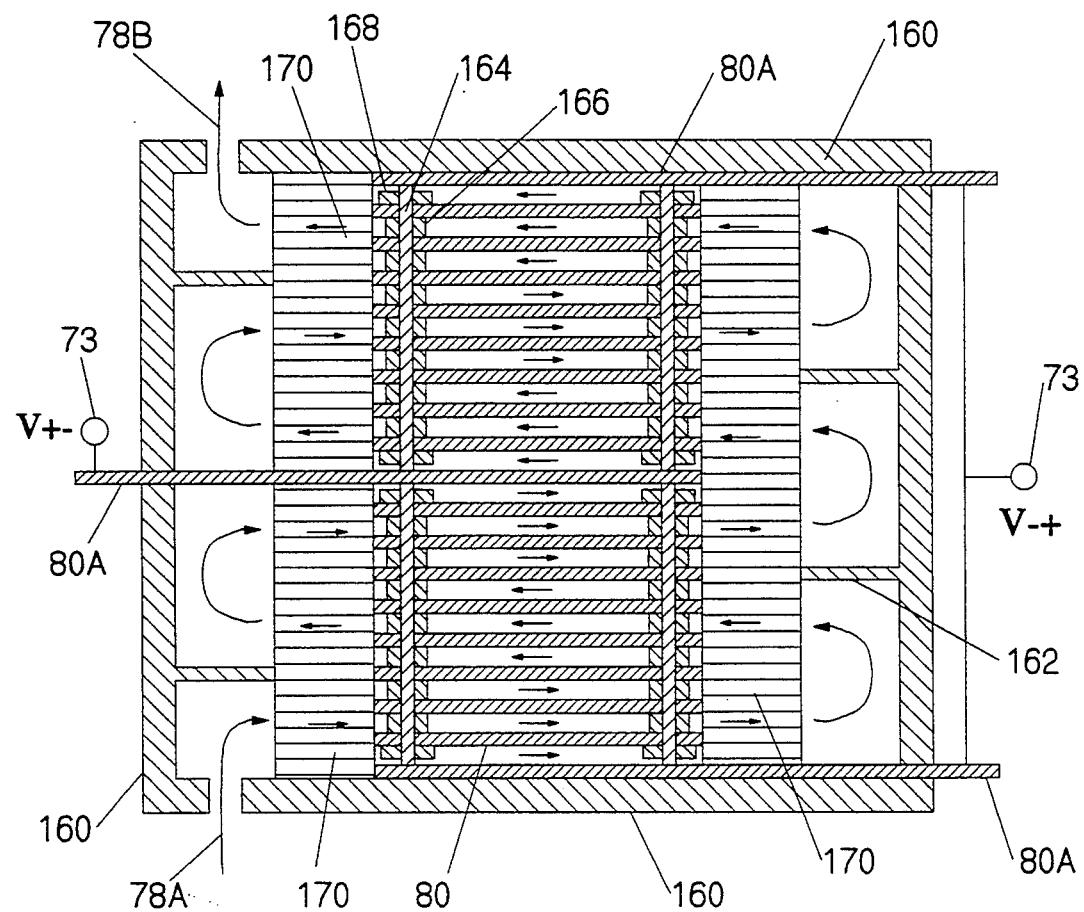

FIG. 10 illustrates another specific embodiment of the bipolar cell.

Figure 11:
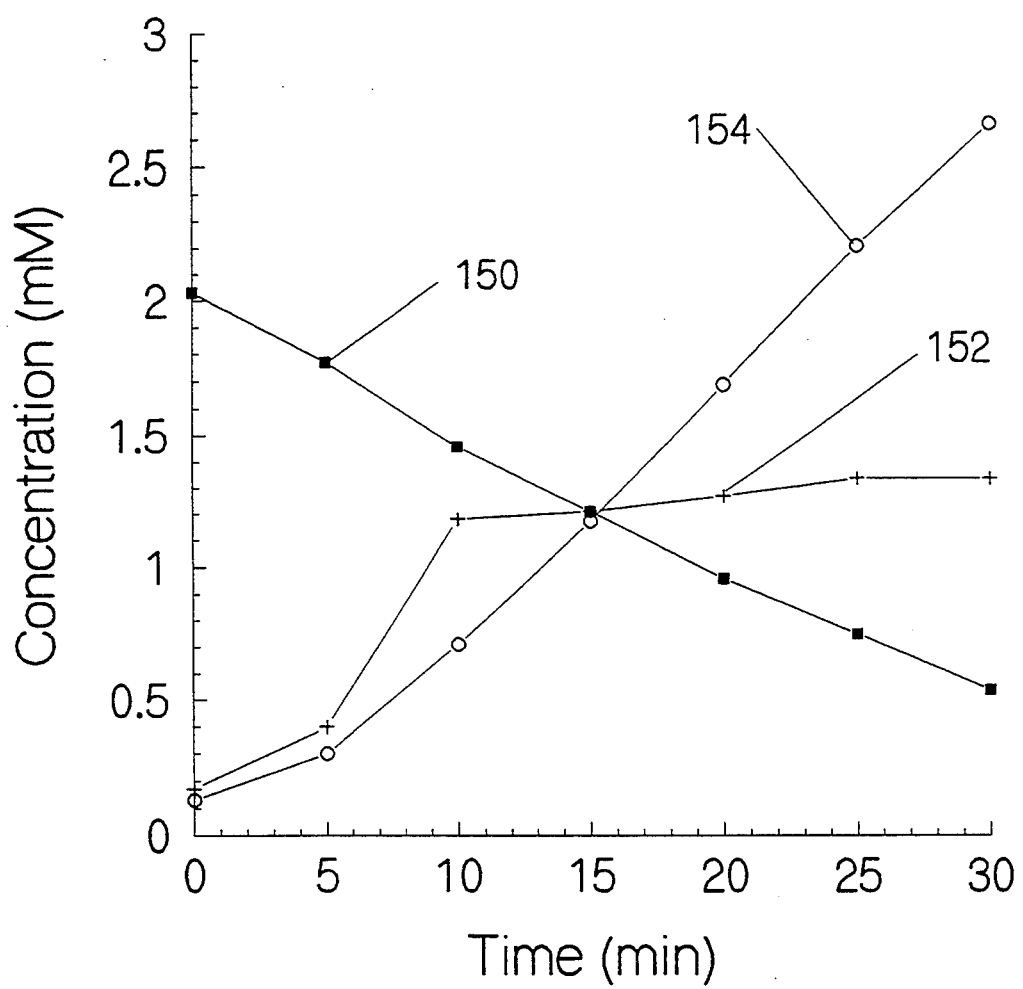

FIG. 11 illustrates oxidation of the herbicide 2,4-dichlorophenoxyacetic acid (2,4-D) to chloride and acetate using the electrochemical process incorporated in our water treatment device. FIG. 11 is discussed in Example 1.

DESCRIPTION

Figure 1:
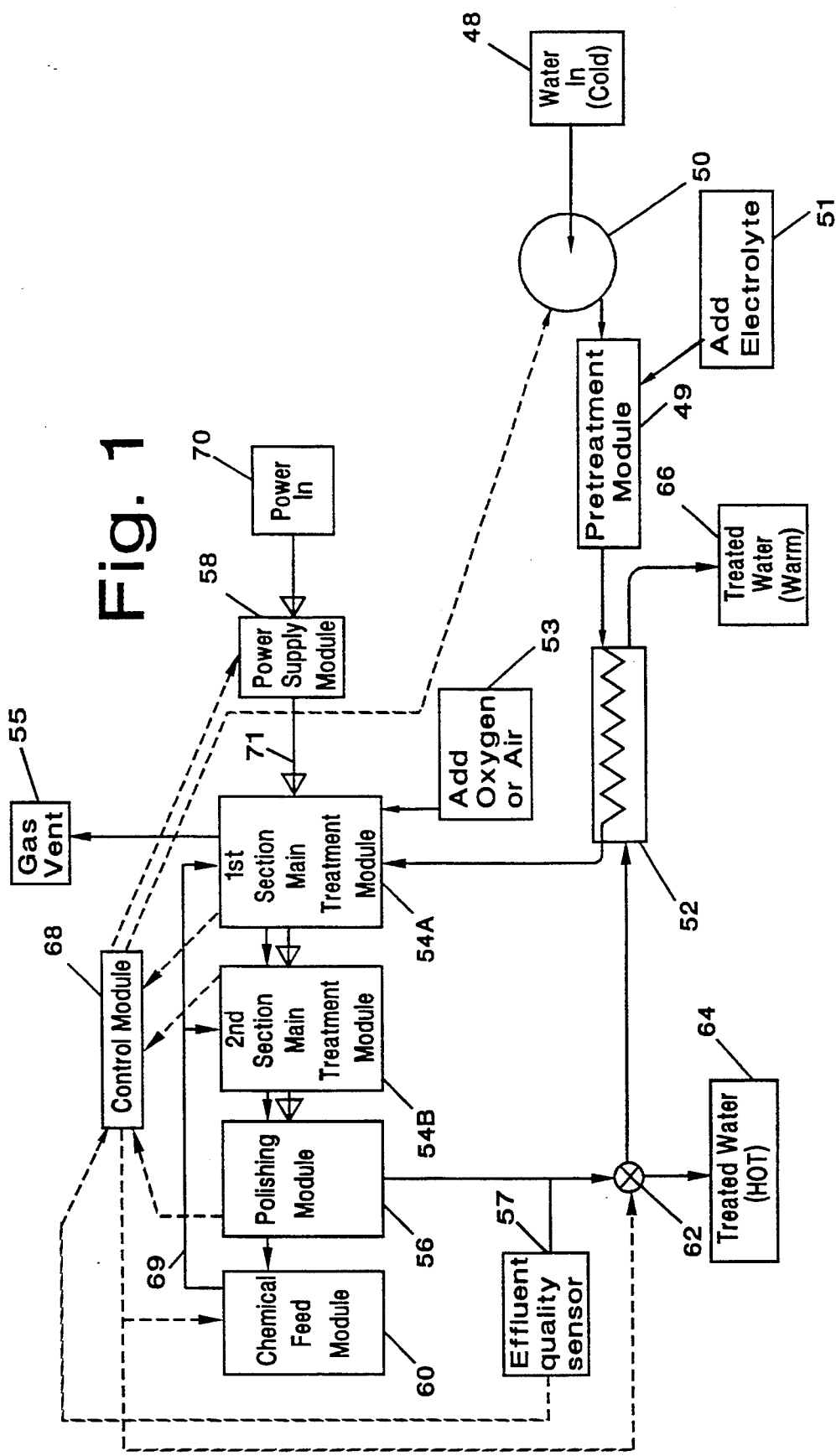
Figure 2:
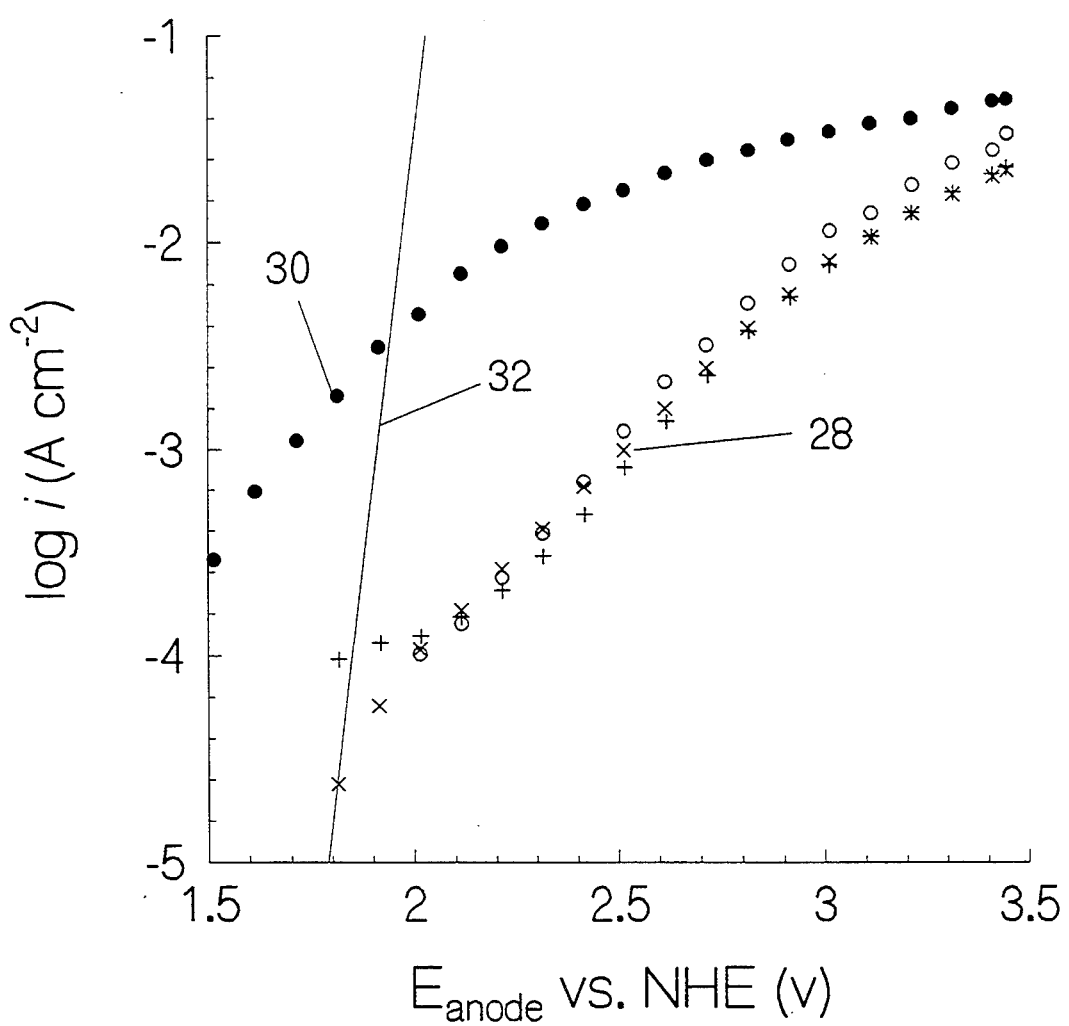
FIG. 2 illustrates the relationship of current density vs. anode potential for several electrodes exemplifying and contrasting Class I and Class II electrode behavior.
Figure 3:
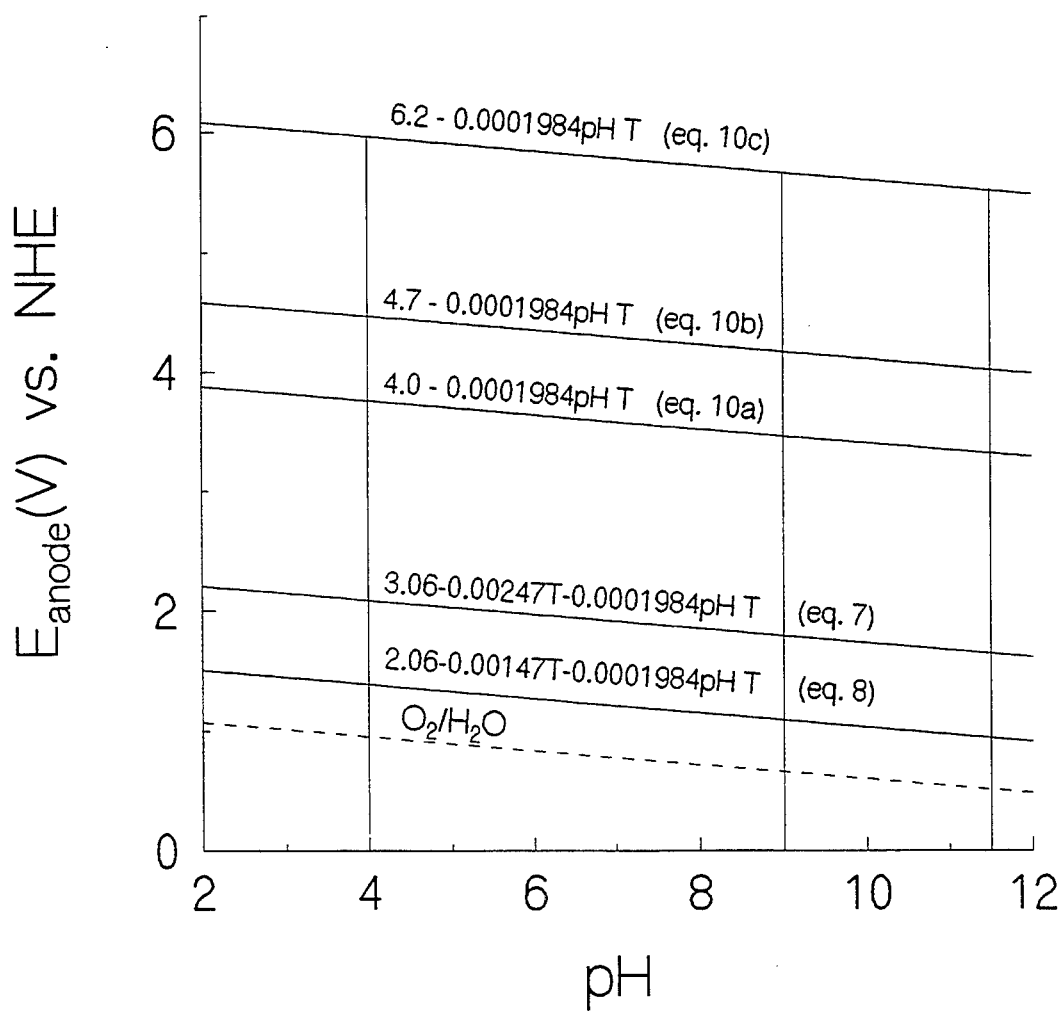
FIG. 3 illustrates the limits of $E_{anode}$ and pH desirable for operation of the process, plotted for the special case T=298.15K.

FIG. 1: Water Treatment Device with Multiple Treatment Stages

FIG. 1 illustrates a water treatment device including two or more treatment stages. This form of the device is most suitable for treating relatively concentrated waste streams, containing more than 200 ppm of oxidizable organic matter. In FIG. 1, solid arrows represent water flows, open arrows represent flows of electrical energy, and dashed lines represent data and control signals.

Electric power 70 is supplied to power supply module 58. A stationary installation would be provided with line power, while a mobile unit would normally be powered by a portable generator driven by a Diesel engine. Power supply module 58 transforms and controls electric power supplied to the treatment modules.

Water entering 48 the water treatment device is metered and controlled by main pump 50. The water first passes through pretreatment module 49, which may include several functions and submodules, including:

(a) An oil-water separator to remove oil.

(b) A filter to remove suspended solids.

(c) A flocculator or water softener to remove iron and manganese.

(d) Electrolytic pretreatment to remove copper or other heavy metals that might otherwise plate out on the electrodes in treatment modules 54A, 54B and polishing module 56.

(e) Chemical addition means 51 to add electrolyte to the water, thereby providing a predetermined value of electrical conductivity.

(f) Chemical addition means to adjust pH of the water entering to a predetermined value.

Heat exchanger 52 transfers part of the heat in treated water 66 leaving the device to water 48 entering the device, in order to increase and control the temperature within the treatment modules. If the concentration of substrate in water 48 entering the water treatment device is small, the temperature rise in the treated water will be small in proportion, and heat exchanger 52 and temperature control valve 62 may not be necessary.

The main treatment module includes one or more stages or sections; by way of example, two sections 54A and 54B are shown in FIG. 1. Each treatment stage includes one or more electrochemical cells, preferably bipolar cells, which are well-suited for removing relatively large concentrations of oxidizable substrates. Cells of other configurations may also be used; for example, cells containing anodes described in the above identified related patent application alternating with cathodes of another composition; for example, graphite, brass, or stainless steel.

The polishing module 56 also includes one or more electrochemical cells. Because the substrate concentration will be small within the polishing module, a porous anode cell is preferred in this application, but a bipolar cell may also be used, provided with means to recirculate the water and thereby improve mass transfer.

The power supply module 58 converts the electrical power supplied to the device, preferably 240 VAC or three phase 480 VAC, to the form required by the electrochemical cells, which will normally be DC power at a voltage determined by the number of bipolar electrodes in series within the individual cells, and the current density desired. A porous anode cell of equal power rating would require a larger current at a lower voltage. DC power provided to bipolar cells should have its polarity reversed at regular intervals to prevent damage to the electrodes.

The chemical feed module 60 comprises storage containers, pumps, and other equipment needed to provide sodium carbonate 69 or another alkali to control pH of the water within the treatment modules.

Effluent quality sensor 57 is chosen to continuously and automatically monitor a suitable parameter of water quality in the treated water. For example, if total concentration of aromatic hydrocarbons or phenols is the water quality parameter of concern, absorption of ultraviolet light at about 280 nm wavelength is a sensitive and appropriate indicator of treated water quality.

The operation of the entire device is monitored and controlled by the control module 68. Control module 68 may be a specialized unit designed for this service, or it may include a dedicated personal computer connected to appropriate sensors and actuators.

DESCRIPTION

Figure 4:
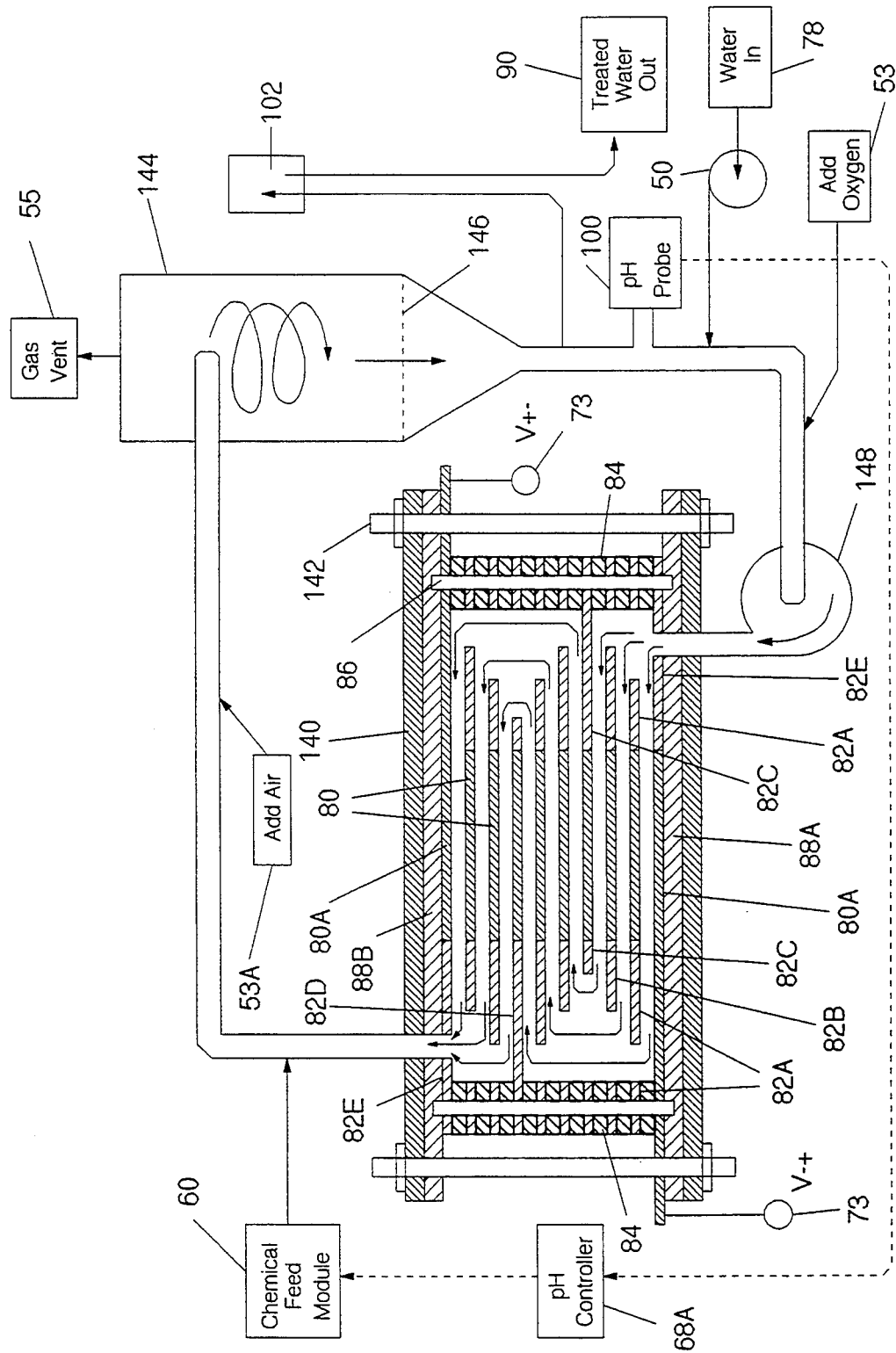
FIG. 4 depicts a water treatment module including a bipolar cell.

FIG. 4: Treatment Module Including Bipolar Cell

FIG. 4 shows a water treatment module including a bipolar cell. With the addition of an appropriate power supply module, this treatment module will constitute a simple water treatment device, but it will normally be used as a treatment module within a more complete water treatment device as illustrated in FIGS. 1 and 9.

In the bipolar cell, each bipolar electrode 80 preferably will be made of Ti with an oxide coating comprising $TiO_2$ doped with Nb or Ta in the +4 valence state. However, Ti-metal substrates coated with another suitable n-doped semiconductor composition may also be employed. Ceramic electrodes of the corresponding mixed metal oxide composition may also be employed. A bipolar cell will normally be powered by direct current with the polarity periodically reversed. The two faces of each bipolar electrode 80 are identical and each face alternates between serving as an anode and serving as a cathode.

FIG. 4 illustrates a specific embodiment of a bipolar cell. Different constructions are possible; for example, the bipolar cell in FIG. 10. Except for the longer breakout electrodes 80A, all of bipolar electrodes 80 have the same dimensions and rectangular shape. The metallic substrates of bipolar electrodes 80 preferably are made of Ti sheet that has been textured or "rigidized" by cold rolling between patterned rollers. The resulting uneven surface texture increases the amount of turbulence produced in water flowing past the bipolar electrodes thereby improving mass transfer. Structurally distinct turbulence promoting means may also provided; for example, a coarse plastic mesh placed between adjacent bipolar electrodes.

Figure 5:
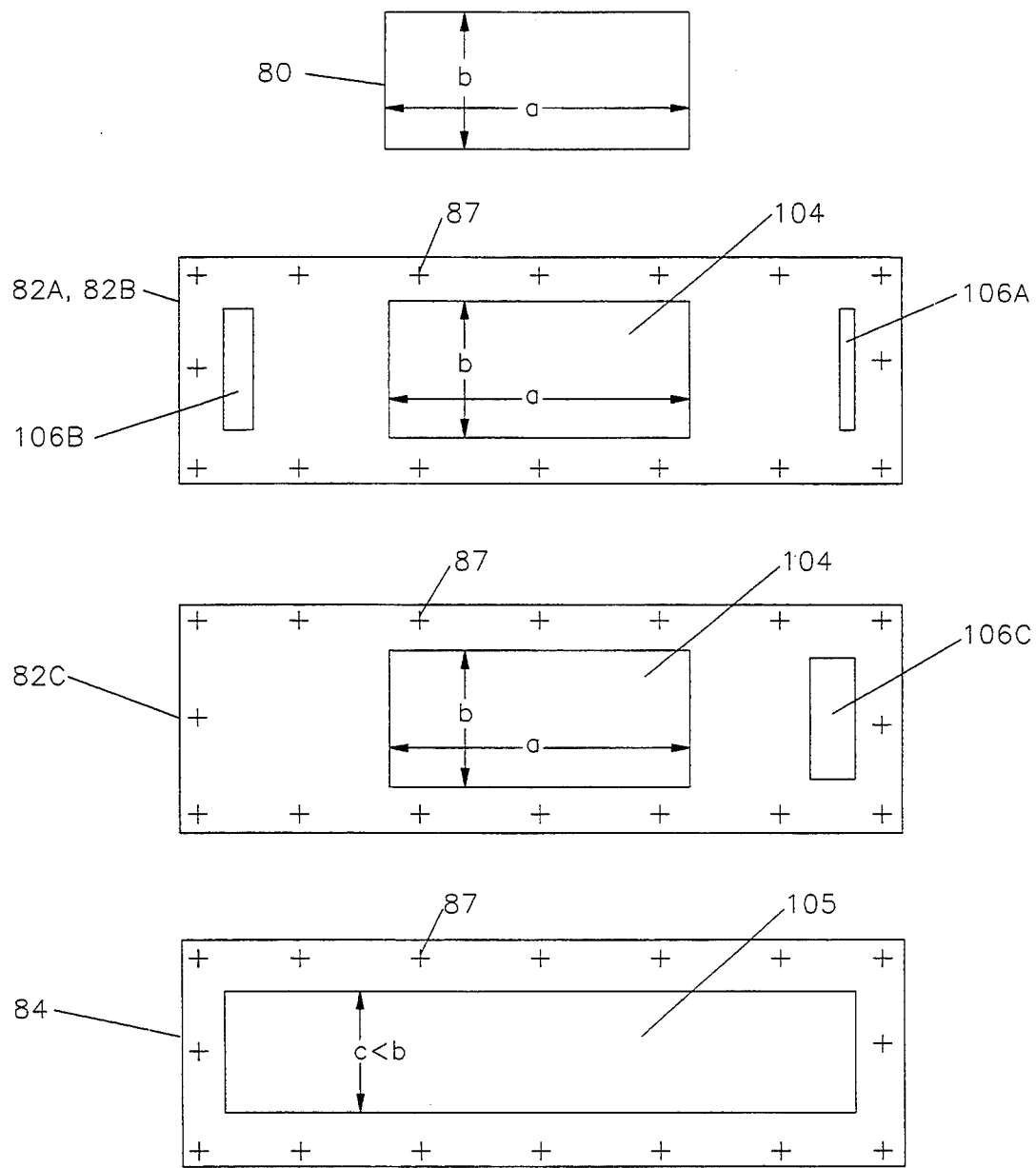
FIG. 5 depicts the mounting gaskets and spacer gaskets used in the bipolar cell of the water treatment module in FIG. 4.

The gaskets and electrodes included in one specific, detailed design are illustrated in FIG. 5, described below. The electrode array within the bipolar cell includes an alternating sequence of mounting gaskets 82A, 82B, 82C and spacer gaskets 84 held in alignment by the plastic alignment pins 86. Bipolar electrodes 80 are placed within the mounting windows of mounting gaskets 82A, 82B, 82C and held in place by the spacer gaskets 84 as described in connection with FIG. 5, below. Polypropylene is an appropriate material for the mounting gaskets, and ethylene-propylene rubber is an appropriate material for the spacer gaskets, because these materials are relatively inexpensive, have a good range of operating temperature, and are not favored as substrates for attack by hydroxyl free radical. When pressed against each other, polypropylene and ethylene-propylene rubber form a reliable water tight seal. Other plastics and rubbers with suitable chemical and physical properties may also be used.

The electrode array is assembled by placing the gaskets upon plastic alignment pins 86 in the following order:

(1) Spacer gasket 84.
(2) Electrode 80 and mounting gasket 82A installed with single width flow window to the left and double width flow window to the right.
(3) Spacer gasket 84.
(4) Electrode 80 and mounting gasket 82B which is identical to mounting gasket 82A, but installed with single width flow window to the right and double width flow window to the left.
(5) Spacer gasket 84.
(6) Electrode 80 and mounting gasket 82C with its single triple width flow window to the left.
(7) Spacer gasket 84.
(8) Electrode 80 and mounting gasket 82B installed with single width flow window to the right and double width flow window to the left.
(9) Spacer gasket 84.
(10) Electrode 80 and mounting gasket 82A installed with single width flow window to the left and double width flow window to the right.
(11) Spacer gasket 84.
(12) Electrode 80 and mounting gasket 82D, which is identical to 82C, but installed with its single triple width flow window to the right.

This sequence is repeated. At either end of the array an electrical connection 73 is made to a breakout electrode 80A which is longer than electrodes 80, and protrudes from the edge of the cell through specially cut mounting gasket 82E. The specific embodiment of the bipolar cell illustrated in FIG. 4 has only two breakout electrodes 80A. The bipolar cell includes nine unit electrochemical cells grouped in series to form a single battery. Therefore, the voltage applied to power input terminals 73 must be nine times the unit cell voltage $V_{cell}$, and the current flowing through the bipolar cell will be the same as the current flowing through each unit cell within it.

The electrode array is bounded at either end by end plates 88A and 88B, which may be made of polymethylmethacrylate or another rigid plastic material. Alignment pins 86 are attached to the lower end plate 88A by screwing them into corresponding blind tapped holes in lower end plate 88A. The entire cell assembly is held together by metal compression plates 140 and compression bolts 142, which provide the force that compresses the entire array of electrodes and gaskets and provides a reliable seal against the pressure of water inside the cell. Alignment pins 86 are preferably made of threaded nylon rod, and compression plates 140 are preferably made of aluminum.

The water circulation loop within the treatment module includes circulation pump 148, the bipolar cell assembly, gas-liquid separator 144, and mesh filter 146. Water flows past pH probe 100 which is connected to pH controller 68A, which controls chemical feed module 60. Gas injection means may be provided to add oxygen 53 or air 53A to the water, and excess air and gases produced by electrochemical reactions within the water treatment module are discharged through gas vent 55. Pump 50 propels and meters water 78 entering the treatment module. Treated water 90 leaves the treatment module by way of overflow water level controller 102.

DESCRIPTION

FIG. 5: Gaskets for Bipolar Cell

Mounting gaskets 82A and 82C, and spacer gaskets 84 have the same external dimensions, and a multiplicity of holes 87 around the periphery which fit over plastic alignment pins 86 when the electrode array is assembled, providing good alignment of gaskets and electrodes within the assembly.

Mounting gaskets 82A and 82C may be made of polypropylene sheet of approximately the same thickness as bipolar electrode 80, allowing for the increased thickness of bipolar electrode 80 due to the textured surface pattern provided as a turbulence promoting means. Mounting window 104 in mounting gaskets 82A and 82C has the same dimensions a×b as bipolar electrode 80, allowing bipolar electrode 80 to be placed in mounting window 104 with a snug fit. Width c of spacer gasket window 105 is smaller than width b of bipolar electrode 80. Thus, when mounting gaskets 82A and 82C are stacked in alternation with spacer gaskets 84 with bipolar electrodes 80 placed in mounting windows 104, bipolar electrodes 80 rest upon the inner edges of spacer gaskets 84, and are held firmly in place in all three dimensions.

In a large bipolar cell, the mounting gaskets can be provided with two or more mounting windows, each one of the windows holding a separate bipolar electrode. This design allows small bipolar electrodes to be assembled into a bipolar cell with large dimensions.

Flow windows 106A, 106B and 106C allow water to flow in the vertical direction through the electrode array. The width of the flow windows varies in proportion to the vertical water flow at that point. The distance between juxtaposed surfaces of bipolar electrodes 80 in the assembled cell is approximately equal to the thickness of spacer gaskets 84, and said thickness is chosen to provide the desired electrode separation.

Within the assembled bipolar cell in FIG. 4, mounting gaskets 82A, 82B, 82C are coplanar with bipolar electrodes 80, and effectively extend the dimensions of bipolar electrodes 80. The arrangement of mounting gaskets within the bipolar cell defines the water flow path through the cell, which follows a serpentine path. Water flows through channels between adjacent pairs of electrodes and the mounting gaskets which extend their dimensions. In the specific embodiment illustrated in FIG. 4, water flows in the same direction through three adjacent channels, then turns around in a space defined by the flow windows of five adjacent mounting gaskets, and flows in the opposite direction through the next group of three channels. Mounting gasket 82C has no flow window at one end; this part of mounting gasket 82C serves as a baffle that forces the flowing water to reverse direction and flow through the next group of three adjacent flow channels.

The design and arrangement of the gaskets determine the flow pattern. In FIG. 4, the flow channels are grouped in threes, but the gaskets may be cut to group any number of channels together. If the total number of bipolar electrodes is fixed, the number of groups will vary in inverse proportion to the number of channels per group. If the linear flow velocity of water between the electrodes is fixed, the required output (for example, gallons per minute) of circulation pump 148 will vary in proportion to the number of flow channels in a group, and the required pumping head will decrease approximately in proportion to the number of groups. Thus, the number of flow channels grouped together can be selected to provide a convenient combination of values for the output and pumping head of circulation pump 148.

That mounting gaskets 82A, 82B, 82C effectively extend the dimensions of bipolar electrodes 80 located within their mounting windows serves an important electrical purpose as well. It is not desirable that current flow through the electrolyte solution except between immediately adjacent electrodes. "Edge leakage" of current around the edges of the intervening bipolar electrodes expends electrical energy on ohmic heating of the electrolyte solution instead of powering the desired electrochemical reactions producing hydroxyl free radical, and produces "hot spots" of high current density at the edges of the electrodes, possibly causing localized damage. Extending the dimensions of the electrodes with the plastic sheet material of the mounting gaskets effectively blocks conduction paths through the electrolyte solution connecting bipolar electrodes not immediately adjacent to each other, by making the available conduction paths very long, and thereby eliminates the edge leakage problem.

DESCRIPTION

Figure 6:
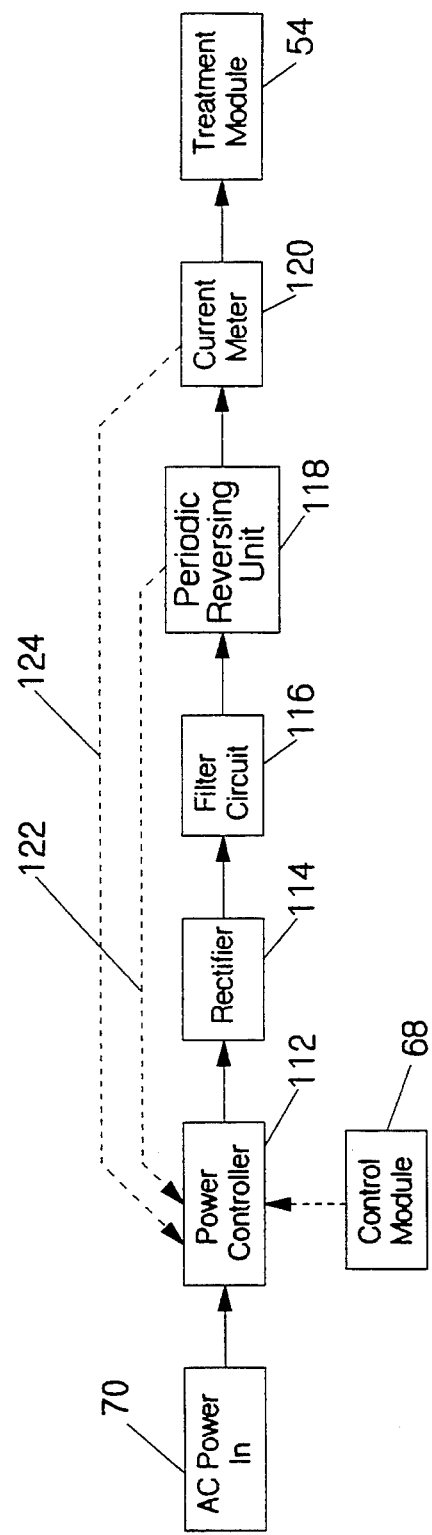
FIG. 6 is a block diagram of power supply module 58 in FIG. 1 and FIG. 9.

FIG. 6: Power Supply Module

Components included in power supply module 66 and its interconnections with the rest of the water treatment device are illustrated in FIG. 6. The power supply module comprises power controller 112, rectifier 114, filter circuit 116, periodic reversing unit 118, and current meter 120. Power controller 112 preferably includes a silicon controlled rectifier circuit.

Power 70 supplied to the water treatment device will normally be AC, preferably at 240 or 480V. Three phase input power is preferred in larger treatment units, because it is better suited to high power systems, and because using three phase power decreases the size and cost of filter circuit 116 needed to decrease ripple in the DC power delivered to water treatment module 54. One phase power may be preferred for smaller units because it allows simpler design. The water treatment module may also be powered by DC power at an appropriate voltage. In this case, a suitable DC power controller 112 must be substituted, and rectifier 114 and filter circuit 116 would be unnecessary.

Periodic reversing unit 118 reverses polarity of DC power supplied to treatment module 54 at predetermined intervals. Periodic reversing unit 118 is necessary if a bipolar cell is used, or another cell configuration where the two opposing electrodes are the same. Periodic reversing unit 118 is not needed if the cell design employed includes a cathode different from the anode, with composition suitable for continuous operation as a cathode.

A separate power supply module will generally be provided for each treatment module or treatment stage within the water treatment device, allowing voltage and current supplied to each treatment stage to be independently controlled.

DESCRIPTION

Figure 7:
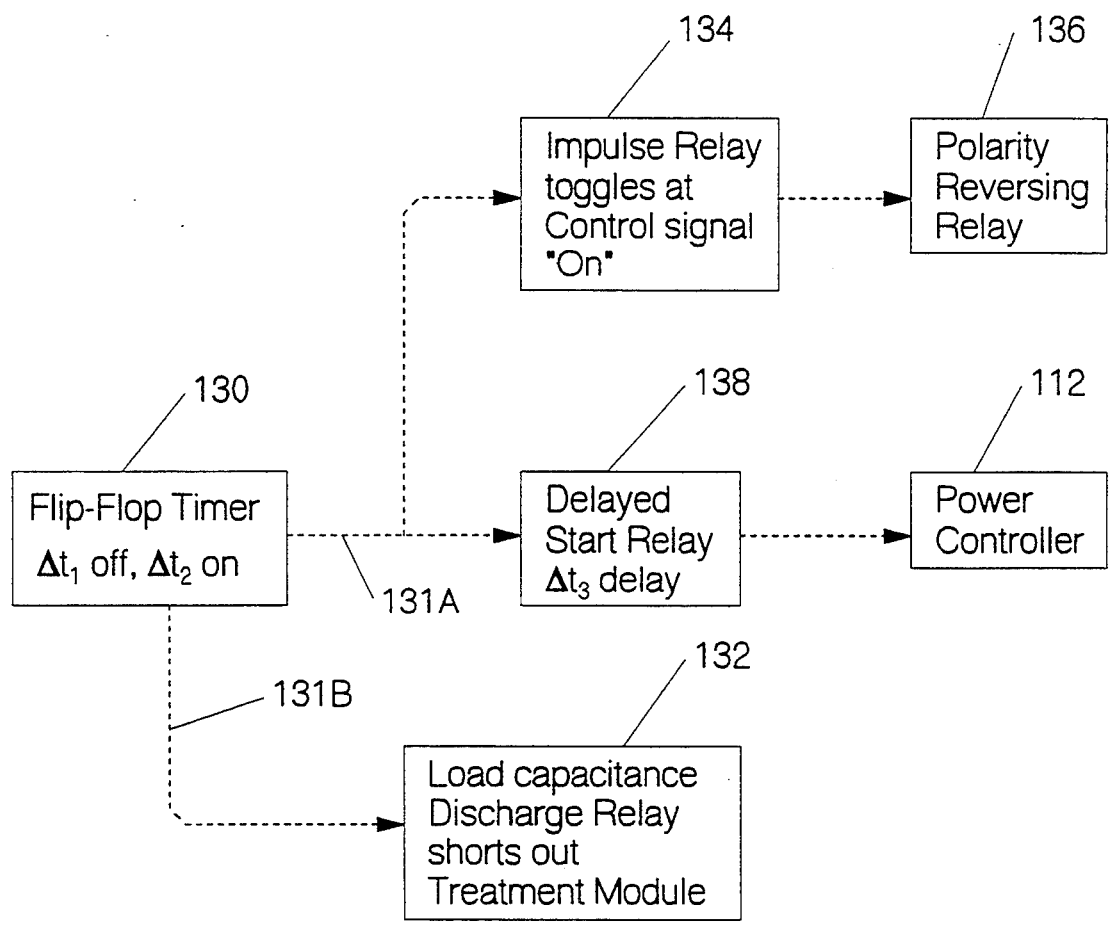
FIG. 7 is a block diagram of periodic reversing unit 118 in FIG. 6.

FIG. 7: Periodic Reversing Unit

The principal components included in periodic reversing unit 118 and the control signals between them are diagramed in FIG. 7. These include flip-flop timer 130, load capacitance discharge relay 132 which discharges the internal capacitance of treatment module 54 while power is turned-off, impulse relay 134 which toggles at the start of "on" pulse 131A and controls polarity reversing relay 136, and delayed start relay 138 which delays the power-on signal to power controller 112. Load capacitance discharge relay 132 can be wired to discharge the capacitors in filter circuit 116 as well.

DESCRIPTION

Figure 8:
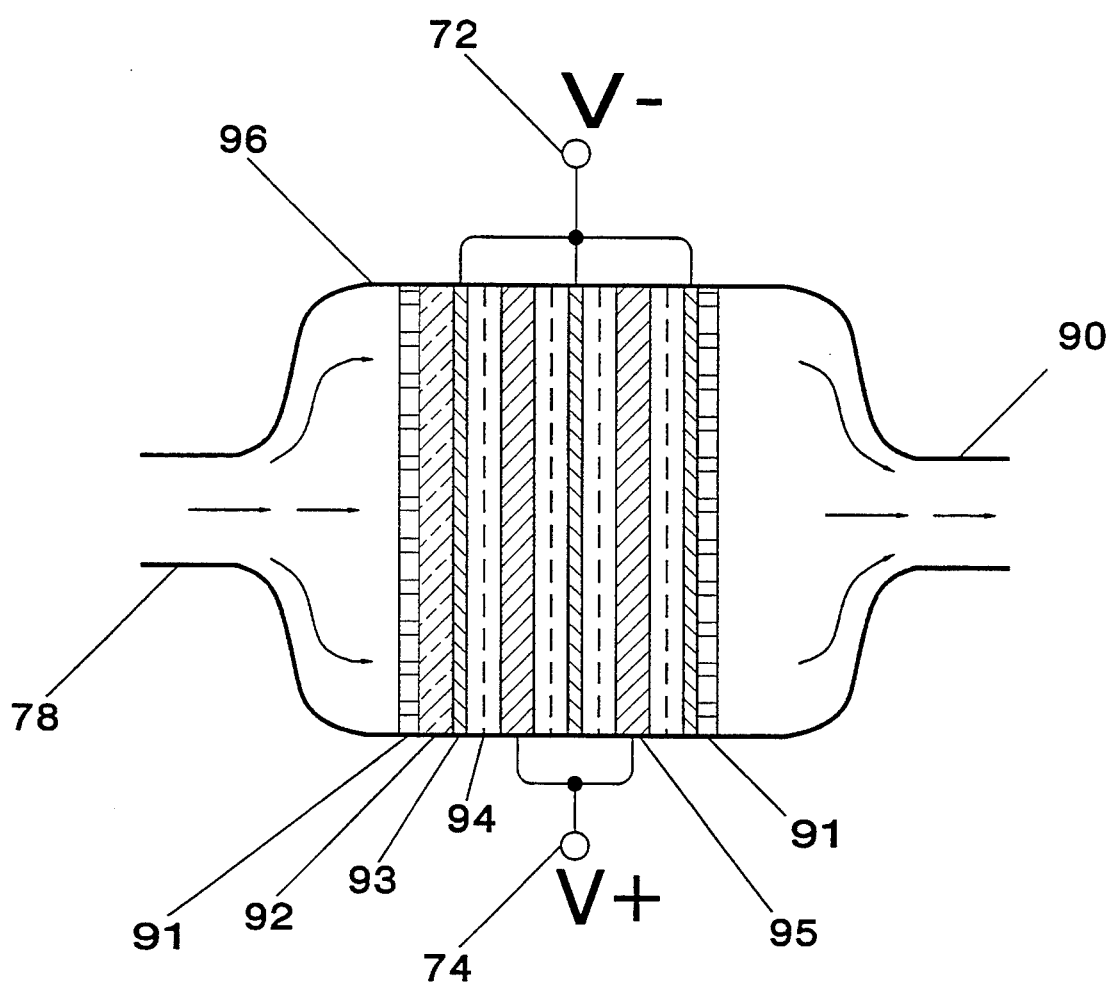
FIG. 8 depicts an electrochemical cell that includes porous anodes.

FIG. 8: Porous Anode Cell

The surface area of the anode is maximized by providing a porous anode, preferably comprising a metallic substrate formed of Ti-metal fibers, sintered or welded or otherwise fused at their contact points to produce a physically coherent and electrically conductive structure. In the finished anode, each metal fiber is covered with a thin oxide coating comprising titanium dioxide with an admixture of Nb or Ta in the +4 valence state. A metallic substrate made of sintered or otherwise fused Ti-metal particles may also be used. The porous anode may also comprise continuous fibers or fine wires of Ti covered with an oxide coating of the composition recited above, and provided with electrical connecting means allowing a reliable electrical connection to the power supply module. The porous anode may also comprise particles of the corresponding mixed metal oxide material, fused by deposition of the oxide coating upon and between the particles.

Using a substrate made of sintered Ti-metal fibers or very fine wires provides a large surface area in relation to the weight of the metal, and the permeability of the resulting anode is high. Also, the anodes are easy to fabricate and are not fragile. The sintered Ti-metal fiber substrate is preferably made in the form of a thin sheet, with thickness 1 to 3 millimeters most advantageous to the purpose. If water of low electrolyte content is being purified, the voltage drop in the electrolyte solution within the porous anode may be substantial, and the current density at the surface of the fibers will be much larger near the surface of the porous anode than in the middle. In this case, the thin sheet geometry is preferred, because it allows more uniform current distribution throughout the volume of the porous anode.

In the specific embodiment of the porous anode cell depicted in FIG. 8 the porous anodes are assembled in an array. The porous anode cell comprises at least one porous anode 95 and at least one permeable cathode 93, and is contained within housing 96, and said housing is fabricated of an electrically nonconductive material; for example, one of the polyolefin plastics. The porous anodes 95 are connected to the positive pole 74 of a source of electric current, while permeable cathodes 93 are connected to the negative pole 72 of a source of electric current. Water 78 flows into the housing, flows through the array of electrodes, and flows out 90 of the other end of the housing. Porous anodes 95 and permeable cathodes 93 alternate in the array with permeable electrically nonconductive separators 94 placed between them to prevent an electrical short circuit. Separators 94 may be made of a fine plastic mesh, but glass or plastic textiles or similar porous nonconductive materials would also serve. Before reaching the electrodes, the water passes through prefilter 92, which removes suspended particles from the water and thereby prevents clogging of the porous anodes and nonconductive separators. Perforated end plates 91 hold the other components in place and pressed together, while allowing water to flow through the porous anode cell.

Titanium fibers are available in the form of continuous bundles consisting of tens or hundreds of fibers, and these continuous fibers may be oxide coated and assembled together with the other necessary components to form a porous anode cell. A porous anode comprising a continuous bundle of fibers naturally lends itself to a cylindrical geometry, wherein the bundle of coated fiber is wound around an appropriate cylindrical form, followed by a nonconductive separator, and then by the permeable cathode, and this sequence may be repeated with necessary electrical connecting means to the power supply module provided.

DESCRIPTION

FIG. 9: Water Treatment Device with Single Treatment Stage

A water treatment device including a single treatment stage is depicted in FIG. 9.

Either bipolar cells or porous anode cells or another kind of electrochemical cell may be used in the treatment module. In any case, the anode should include a titanium metal substrate with an n-doped metal oxide coating, preferably comprising titanium dioxide with an admixture of Nb or Ta in the +4 valence state. A porous or solid ceramic anode comprised of the corresponding mixed metal oxide material may also be used.

The bipolar cell is well-suited for operation at relatively large current density at the surface of the anode ($i \geq 10$ mamp cm$^{-2}$). A specific embodiment of a treatment module including a bipolar electrode cell is shown in FIG. 4.

The porous anode cell has a very large anode surface area, and affords excellent mass transfer performance. The porous anode cell is preferred when the concentration of oxidizable substrates in the water being treated is relatively small; for example, less than 20 mg/L of oxidizable organics. In this case, treatment module 54 may simply be the porous anode cell depicted in FIG. 8.

The single stage water treatment device in FIG. 9 will be the preferred configuration if the concentration of pollutants to be removed from the water 48 entering the device is small enough to be substantially eliminated in a single treatment stage.

Normally, this situation will arise when the concentration of pollutants in the water is small to begin with, and this situation will favor using the porous anode cell. Therefore, the porous anode cell is preferred for use in the single stage water treatment device in FIG. 9.

Water entering 48 the water treatment device is metered and controlled by main pump 50. The water first passes through pretreatment module 49.

Oxygen or air 53 may be added to the water in treatment module 54, in order to increase the concentration of oxygen dissolved in the water. Treatment module 54 may be operated at pressure greater than atmospheric. If the treatment module is operated at pressure greater than atmospheric, pressurization pump 76 is needed to introduce water into pressurized treatment module 54, and the water treatment device is further provided with choke valves 79A and 79B which allow treated water 66 and vented gas 55 to leave the pressurized treatment module in a controlled manner which maintains constant water level within the treatment module with the predetermined operating pressure. If the operating pressure is high enough to prevent formation of gas bubbles and neither air nor oxygen is injected, gas choke valve 79B and gas vent 55 may be unnecessary. The system may be designed so that main pump 50 also pressurizes water treatment module 54, in which case pressurization pump 76 may be unnecessary.

In some applications the water treatment device may be connected to a source of water under pressure; for example, a water supply pipe. In this case, the pressure of the incoming water propels the water through the device, and pressurizes treatment module 54, and pumps 50 and 76 may be unnecessary.

Control module 68 controls operation of the entire water treatment device.

Electric power 70 is supplied to power supply module 58. A stationary installation would be provided with line power, while a mobile unit would normally be powered by a portable generator driven by a Diesel engine. Power supply module 58 transforms and controls electric power supplied to treatment module 54. If treatment module 54 includes a bipolar cell, power supply module 58 will include a periodic reversing unit. If treatment module 54 includes a porous anode cell wherein the cathode is distinct from the anode, DC power of constant polarity will be required, and no periodic reversing unit will be present.

DESCRIPTION

FIG. 10: Another Specific Embodiment of the Bipolar Cell

The bipolar cell is assembled in external case 160, preferably made of plastic. Water enters the cell at 78A and leaves it at 78B, driven by an external circulating pump (not shown in FIG. 10). Bipolar electrodes 80 are assembled in blocks held together by tie bolts 164 and nuts 168, with spacers 166 defining the distance between adjacent electrodes. Parts 164, 166 and 168 are most conveniently made of plastic, but could also be made of an appropriate ceramic material, allowing the assembled block of electrodes to be annealed at high temperature as part of the process of coating or rejuvenating bipolar electrodes 80. Breakout electrodes 80A connect the electrode arrays within the bipolar cell to power input terminals 73. In FIG. 10 breakout electrodes 80A are not bolted together with bipolar electrodes 80, but they could be.

In FIG. 10 two batteries of bipolar electrodes 80 are placed back-to-back and provided with three breakout electrodes 80A. The two break-out electrodes at either end of the bipolar cell are electrically connected to one power input terminal 73, and the third, central breakout electrode 80A will be connected to the opposite power input terminal 73. The required voltage will be the same as in FIG. 4, (nine times the unit cell voltage, $V_{cell}$), but the current through the complete bipolar cell will be doubled. In effect, we have now grouped 18 unit cells into two batteries of 9 cells that are wired in parallel.

Any number of unit cells can be grouped into batteries bounded by break-out electrodes. The unit cells within each battery are electrically connected in series, while the batteries within the complete bipolar cell are electrically connected in parallel. Increasing the number of unit cells connected in series to form a battery increases the required operating voltage in proportion, while increasing the number of batteries operated in parallel increases the total current in proportion. Thus, the number of unit cells per battery may be selected to provide convenient values of required voltage and current for the entire bipolar cell.

The only electrically conductive members in contact with the electrolyte solution in FIGS. 4 and 10 are the oxide coated titanium electrodes. Most electrically conductive materials would be severely and rapidly corroded if polarized to the high anodic potential required to generated hydroxyl free radical, and surface covered with gold or platinum would be depolarized by electrolysis of water to form oxygen at a potential far less positive than needed to make hydroxyl free radical. In FIGS. 4 and 10 breakout electrodes 80A are increased in length to extend beyond external case 160 of the bipolar cell, allowing electrical contact to ordinary conductors to be made in a dry area. Only those parts of the surface of the breakout electrode that are opposed to bipolar electrodes 80 need to have the n-doped semiconductive oxide coating. Breakout electrodes 80A can also be made by welding a piece of Ti wire or a strip of Ti sheet to a bipolar electrode 80 of normal dimensions, and extending the wire or connector strip out beyond external case 160. Conventional electrical connectors could also be used (e.g. copper wire) but they would have to be completely covered with an appropriate insulating material to keep them completely dry and out of electrical contact with the electrolyte solution.

Corrugated plastic blocks 170 border bipolar electrodes 80 at either end along the direction of water flow. Corrugated plastic blocks 170 may resemble corrugated cardboard, comprising alternating flat plastic sheets and sinusoidal plastic sheets fused at their contact points, or they may have a hexagonal honeycomb structure or a square honeycomb structure, or another structure that provides a many parallel flow channels defined by thin plastic walls between them. Corrugated plastic blocks 170 block electric currents through the electrolyte solution between pairs of bipolar electrodes 80 that are not immediately adjacent, and help define the pattern of water flow through the cell. The spacing of flow channels through corrugated plastic block 170 must be no larger than the spacing of bipolar electrodes 80A. Plastic flow baffles 162 are welded to the walls of external case 160, and define the sinusoidal flow pattern through the cell.

DESCRIPTION

FIG. 11: Oxidation of 2,4-D

FIG. 11 is described in connection with Example 1, below.

OPERATION OF INVENTION

Operation–FIG. 1: Water Treatment Device with Multiple Treatment Stages

Water 48 entering the water treatment device is metered and controlled by main pump 50. The water first passes through pretreatment module 49 which separates oil from the water, filters it, pretreats it to remove heavy metals if necessary, and adds electrolyte 51 to provide the predetermined electrical conductivity needed for efficient and reliable operation of the electrochemical water treatment process.

Water entering the water treatment device is preheated in heat exchanger 52 by taking heat from treated water 66 exiting the water treatment device, and then goes to the main water treatment module that includes sections 54A and 54B. The temperature of water within the water treatment device will ideally be near 90° C. if substrates of limited water solubility are being oxidized; for example, many common pesticides. Operation at elevated temperature also decreases operating voltage required to maintain a given current density and decreases the amount of electrical energy consumed in proportion.

Oxygen or air 53 may be injected into the circulating water to increase the concentration of dissolved oxygen. Addition of oxygen is particularly desirable if a bipolar cell is used, because a bipolar cell will ordinarily be operated at relatively high current density, requiring a larger concentration of oxygen to depolarize the cathode. Gas produced by the electrochemical reaction and depleted air or excess oxygen are vented 55 from the main treatment module.

Each section 54A, 54B within the main water treatment module is operated within the current limited regime. In practice, this means operation of each section at the maximum current density consistent with efficient utilization of energy, given the concentration of substrate present in the water in that section. Thus, the current density in second section 54B is smaller than in first section 54A, in proportion to the substrate concentration. The main treatment module destroys most of the substrate in an energy efficient manner. Bipolar cells are preferred over porous anode cells if the concentration of substrate initially is large.

Polishing module 56 normally operates in the diffusion limited regime, and rapidly destroys most of the substrate remaining in the water coming out of the main treatment module. Polishing module 56 is operated to achieve substrate concentration in the water leaving the water treatment device small enough to allow the water safely to be discharged to the environment. Because the amount of substrate to be destroyed in polishing module 56 is small, it may be operated in the relatively energy-inefficient diffusion limited regime without greatly increasing the total energy consumption of the device. Operation at small current density will also extend the useful life of the electrodes.

If a bipolar cell is used in polishing module 56, it will be operated in the diffusion limited regime. If a porous anode cell is used, it may be operated in the current limited regime at the inlet of polishing module 56, and in the diffusion limited regime at the outlet. If the porous anode cell is similar to the one depicted in FIG. 8 including a multiplicity of porous anodes in sequence without recirculation of water, it will behave as a sequence of small treatment stages.

Temperature control valve 62 controls the amount of hot treated water that goes through heat exchanger 52, and thereby determines the temperature increase in the water entering the device. Treated water 64 not sent through heat exchanger 52 is discharged from the device at full temperature. Treated water 66 that passes through the heat exchanger 52 is discharged from the device at a lower temperature, having transferred part of its heat content to water 48 entering the water treatment device.

The operation of the entire device is monitored and controlled by the control module 68. Control module 68 monitors the temperature and pH of the water in the device, and the concentration of substrate and/or reaction products in water 64 and 66 leaving the device. It controls main pump 50, chemical feed module 60, temperature control valve 62, and the power supply module 58 to achieve the level of treatment desired, while controlling the temperature and pH of the water, maximizing throughput of the water treatment device, and optimizing energy use.

Power supply module 58 will normally be operated to provide a predetermined value of current through the water treatment modules, by adjusting its output voltage as necessary. Effluent quality sensor 57 continuously monitors the quality of the treated water, and main pump 50 is adjusted to give the maximum throughput consistent with maintaining predetermined effluent quality. Sodium carbonate or another appropriate alkali is added 69 as needed to maintain pH of the water within the water treatment device within a predetermined range favorable to operation of the water treatment device.

Operation–FIG. 4: Treatment Module Including Bipolar Cell

A water treatment module including a bipolar cell as illustrated in FIG. 4 is appropriate when the concentration of oxidizable substrates in the water to be treated is greater than about 20 mg/L. The bipolar electrodes within the bipolar cell are not electrically connected except through the electrolyte solution between them. DC power is supplied to power input terminals 73, and current flows through the array of electrodes alternating with liquid filled spaces between them. Current flows from electrolyte solution into one surface of the electrode, through the metal of the electrode, and out of the electrode into the electrolyte solution at the opposite surface of the electrode, and so on through the entire array of bipolar electrodes in the cell. Thus, one face of bipolar electrode 80 serves as an anode, while the other face simultaneously serves as a cathode.

The polarity of the DC power provided to a bipolar cell should be periodically reversed, so that either face of each bipolar electrode alternates between service as an anode and service as a cathode. Continuous operation of one face of the electrode as a cathode would cause the electrode to absorb electrolytically generated hydrogen and eventually be damaged. Periodically reversing the power also decreases damage processes associated with anodic operation by allowing a 50% anodic duty cycle, and partial reversal of anodic damage during the cathodic part of the duty cycle.

Circulation pump 148 propels water through the bipolar cell at high flow velocity, in order to enhance mass transfer at the surface of the the electrodes 80. The textured pattern of the electrode surface will increase the amount of turbulence produced in the flowing water, improving mass transfer at the surface of the electrode. Circulation pump 148 will typically have one hundred fold larger output than main pump 50, which meters water flow through the module. Water flow velocity between the electrodes will typically be about 1 m/s.

Air 53A may be injected into the circulating water to ensure that water entering the electrochemical cell is saturated with oxygen at atmospheric partial pressure, or pure oxygen may be injected 53 to provide a higher oxygen concentration in the water.

Water exiting the cell is discharged into cyclonic separator 144 wherein gas is separated from the water. The gas separated may include hydrogen produced at the cathode, oxygen produced at the anode, carbon dioxide produced by the oxidation reaction, and excess air or oxygen injected into the water. The gas is vented 55 from the module. Water leaving the separator passes through a mesh filter 146 which removes any coarse particles that may be present thereby protecting the bipolar cell from mechanical blockage, and removes part of the gas that may have remained entrained in the water. The water flows past pH probe 100 and back to circulation pump 148.

Water 78 entering the treatment module is conveyed and metered by main water pump 50, which determines the throughput of the module, and the residence time of water within it. Treated water 90 leaves the module by way of overflow level controller 102.

pH controller 68A monitors the signal from pH probe 100, and causes chemical feed module 60 to add acid or base to the water in the module as needed to keep pH within predetermined bounds.

Operation–FIG. 6: Power Supply Module

Power controller 112 turns power to treatment module 54 on and off, and regulates the current delivered to treatment module 54 when power is on. Control module 68 provides control signals to power controller 112 which cause power delivered to treatment module 54 to be turned on and off in response to a human operator's control actions, and predetermines the magnitude of current provided to treatment module 54. Power controller 112 preferably includes a silicon controlled rectifier circuit, which cuts part of the AC waveform out of each cycle of AC power delivered to rectifier 114, thereby controlling the total amount of DC power delivered to treatment module 54. Rectifier 114 converts AC power to DC power. Filter circuit 116 decreases the amount of ripple in DC power output by rectifier 114.

Periodic reversing unit 118 reverses polarity of DC power supplied to treatment module at predetermined intervals. Control signal 122 to power controller 112 turns-off power while the polarity is being reversed. Current meter 120 provides control signal 124 to power controller 112, which controls AC power provided to rectifier 114 as required to maintain constant current to treatment module 54 while power is on.

Operation–FIG. 7: Periodic Reversing Unit

Flip-flop timer 130 controls operation of the periodic reversing unit. Flip-flop timer 130 includes output relays that generate an "on" pulse of duration $\Delta t_1$ followed by an "off" pulse of duration $\Delta t_2$. The durations of the two pulses are independently adjustable. At the start of the "on" pulse, impulse relay 134 toggles from one position to the other, causing polarity reversing relay 136 to switch from one position to the other. Polarity reversal relay 136 determines the polarity of the electrical power applied to power input terminals 73 of the bipolar cell. The "on" pulse also activates delayed start relay 138, which provides a "power-on" pulse to power controller 112 after a delay equal to $\Delta t_3$. Time delay $\Delta t_3$ allows the polarity reversing operation to be completed before the power is turned back on. Power remains on until the end of the "on" pulse of duration $\Delta t_1$.

At the end of time interval $\Delta t_1$, "on" pulse 131A goes to zero, and "off" pulse 131B of duration $\Delta t_2$ begins. Because treatment module 54 contains an electrochemical cell with substantial surface area, it has a large internal capacitance which remains charged after power to it is turned-off. This capacitance should be discharged before applying power of the opposite polarity, in order to prevent a large current surge which might damage the electrodes or the power supply module. "Off" pulse 131B causes load capacitance discharge relay 132 to close, shorting-out the power leads to treatment module 54, thereby allowing the capacitance of treatment module 54 to be discharged through a suitable shunt resistor before power of opposite polarity is applied.

Operation–FIG. 8: Porous Anode Cell

Water to be treated 78 enters the porous anode cell and passes through prefilter 92, and then through an alternating sequence of porous anodes 95 and permeable cathodes 93 with nonconductive permeable spacers 94 between them. Current flows from porous anodes 95 to adjacent permeable cathodes 93.

Flow of current from electrochemically active surfaces of porous anode 95 coated with n-doped semiconducting metal oxide to electrolyte solution causes hydroxyl free radicals to be generated at said surfaces and released to water where the hydroxyl free radicals react with oxidizable organic and inorganic species dissolved in the water. Surface bound hydroxyl free radicals are also produced, and react with oxidizable molecules at said surface. At low substrate concentration, the diffusion of substrate molecules to said surface governs the overall rate of reaction. The very large surface area of porous anodes 95 favors good mass transport, and thereby favors use of porous anodes in applications where relatively small concentrations of oxidizable substrates must be removed from water.

Electrochemical reactions at the electrochemically active surface of permeable cathode 93 include reduction of water to hydrogen gas, and reduction of dissolved oxygen to hydrogen peroxide or to water. Reduction of dissolved oxygen to hydrogen peroxide is preferred, because this reaction decreases $V_{cell}$, thereby reducing energy costs, and the hydrogen peroxide produced assists in oxidation of oxidizable substrates in the water. The fraction of total current at the cathode consumed by reduction of oxygen to hydrogen peroxide depends on the relation of current density to diffusive transport of oxygen to the surface of the cathode. A cathode with large surface area will decrease current density and expedite diffusive transport of oxygen, favoring the cathodic reduction of oxygen to hydrogen peroxide. If the porous anode cell is designed with a permeable cathode that has large surface area, the porous anode cell will make efficient use of oxygen dissolved in the water, and operate at relatively low $V_{cell}$. The low current density at the surface of the porous anode also favors operation at relatively low $V_{cell}$.

The electrical conductivity of the porous anode is relatively small because of its porous structure, and because current must flow in the plane of the electrode rather than perpendicular to the electrode. For this reason, the porous anode is limited to operation at relatively small current density, appropriate to low substrate concentration. Voltage drop in the electrolyte solution within the pores likewise militates against using a porous anode except at low current density. These characteristics make the porous anode cell appropriate in applications where dissolved contaminants present in small concentration must be removed with good efficiency; for example, to purify water that contains a small amount of dissolved phenols or aromatic hydrocarbons.

Operation–FIG. 9: Water Treatment Device With Single Treatment Stage

FIG. 9 illustrates a water treatment device including a single treatment stage. This configuration is most appropriate for applications where the concentration of oxidizable material to be destroyed is not very large, and a single treatment stage is sufficient.

Water to be treated 48 is propelled and metered by main pump 50, and first goes through pretreatment module 49. Pressurization pump 76 provides the pretreated water to treatment module 54 at increased pressure, if necessary. Elevated pressure eliminates the formation of gas bubbles or decreases their volume if formed, which is desirable if a porous anode cell is employed, because gas bubbles may accumulate in the porous anode, interfering with the flow of water through the cell. Suppression of bubbles is also desirable if the water being treated contains abundant surfactants and has a strong tendency to foam. Oxygen 53 or air may be added to the water in the treatment module, in order to increase the concentration of oxygen dissolved in the water, thereby decreasing $V_{cell}$ by depolarizing the cathode and increasing the production of hydrogen peroxide which contributes to the oxidation process. Treated water is depressurized in choke valve 79A, and gas vented from the treatment module is depressurized in choke valve 79B.

Treated water 66 passes through the effluent quality sensor, which provides feedback to control module 68. Pretreatment module 49, control module 68 and effluent quality sensor 57 operate as in the multistage water treatment device in FIG. 1.

EXAMPLE 1

FIG. 11 illustrates the ability of the anodes included in the water treatment device disclosed herein to oxidize an herbicide compound to chloride and acetate. The experiment employed a laboratory test cell consisting of a block of graphite (the cathode) with a 0.75" diameter cylindrical bore, with an anode in the form of a 0.25" diameter rod concentric with the bore and rotating at 400 to 600 rpm. The solution volume was 16 mL, and the active anode area 7.6 $cm^2$. The test solution contained 0.2M sodium bicarbonate, 2 mM 2,4-dichlorophenoxyacetic acid (2,4-D) sodium salt, and 2 mM sodium sulfate. Air containing 6% carbon dioxide was bubbled through the test cell to provide dissolved oxygen and maintain approximately constant pH near 8. The cell was operated with 152 mA current while samples were periodically removed for analysis by ion chromatography using the sulfate peak as an internal standard.

The decline of concentration of 2,4-D 150 was approximately linear, consistent with zero order chemical kinetics and indicating current limited reaction conditions. The concentration of chloride 154 after 30 minutes amounted to 1.7 chloride ions produced per 2,4-D molecule destroyed, indicating nearly complete mineralization of the starting material. Concentration of acetate recorded 152 may include glycolate and chloroacetate, and tended toward a constant value after 10 minutes, indicating that acetate was destroyed nearly as rapidly as it was produced. No other peaks of significant size appeared in the ion chromatograms, indicating that molecules of 2,4-D were rapidly oxidized to chloride, acetate, glycolate, chloroacetate, and carbon dioxide after they reached the surface of the anode.

CONCLUSIONS AND RAMIFICATIONS

While our description contains many specificities, these should not be construed as limitations on the scope of the invention, but rather as an exemplification of a few preferred embodiments thereof. Many other variations are possible, as described in the following paragraphs.

This method is unique in that many different organic compounds dissolved in water may be oxidized in a nonspecific manner under mild conditions. The oxidation of formate ion, the herbicide 2,4-D, the insecticide Dimethoate, aqueous film forming foam, toluene, and cresol has been demonstrated. The organic compounds degraded in the method may be water soluble, aromatic hydrocarbons, or they may be pesticides, herbicides, or other agricultural chemicals, or other organic compounds. Oxidizable inorganic sulfur species soluble in water (for example, sulfite, thiosulfate, tetrathionate, hydrogen sulfide) can also be destroyed using the water treatment device disclosed.

Reactions at the cathode may also contribute to decomposing the substrate molecules, either by direct electrochemical reduction at the surface of the cathode, or by generating and releasing to solution hydrogen atoms, if the cathodic potential is sufficiently negative, and the surface of the cathode is not electrocatalytic for the generation of molecular hydrogen. The composition of the cathode surface may be selected and optimized for this purpose.

Electrolytes may be added to the water purified in order to increase its conductivity or control its pH. Alkaline substances may be added to the water being purified in order to maintain the pH within the desired range. While sodium carbonate and sodium bicarbonate are the least expensive and most convenient alkalis for this purpose, other alkalis may also be used, including sodium hydroxide, potassium carbonate, potassium bicarbonate, potassium hydroxide, calcium hydroxide, and ammonia.

Even compounds of limited solubility may be oxidized efficiently if the water treatment device is operated at an elevated temperature in order to increase the solubility of the substrate.

A water treatment device may be composed of several electrochemical cells and other parts and components necessary and beneficial to the process. In case of small substrate concentration, the device can be simplified by using porous anode cells and fewer of them (perhaps just one), and eliminating the heat exchanger and means for regulating temperature.

While we believe that bipolar electrochemical cells and porous anode cells are best suited for use in a practical water purification device, other kinds of cells may also be used. The bipolar cell designs illustrated in FIGS. 4 and 10 may be used, or different designs.

The water treatment devices may be designed for different capacities, and for operation on different voltages and types of power (single phase AC, three phase AC, or DC). Specific applications may require that certain additional subunits be added to the device, or may allow certain subunits to be eliminated from the device. In every case, a treatment module may be replaced by several smaller modules operating in parallel, allowing flexibility and standardization in operation and design. A wide variety of structural materials may be used in the treatment modules, provided that they have acceptable electrical properties and adequate resistance to fluids and temperatures that may be encountered in the process.

We claim:

1. A water treatment module for decomposing chemical substances dissolved or dispersed in an electrically conductive aqueous medium, including a bipolar electrochemical cell, wherein said bipolar electrochemical cell includes an array of bipolar electrodes, wherein said bipolar electrodes include a surface part and an internal part, wherein said surface part has a semiconducting metal oxide composition including an additive metal having valence states, wherein at least part of said additive metal is in a valence state which n-dopes said semiconducting metal oxide composition, and wherein concentration of platinum group metals in said semiconducting metal oxide composition is zero or too small to exert a significant electrocatalytic effect favoring the generation of oxygen, and wherein said cell is provided with water circulation means, and consists of further providing flow baffles defining a serpentine fluid flow path through said array of bipolar electrodes, and insulating baffles substantially blocking electrical conduction paths through said electrically conductive aqueous medium between bipolar electrodes which are not immediately adjacent within said array.

2. The water treatment module of claim 1, wherein said internal part of said bipolar electrodes comprises a metallic substrate having a composition selected from the group consisting of titanium and titanium alloys, and said semiconducting metal oxide composition contains titanium dioxide, and said additive metal is selected from the group consisting of Nb and Ta, and mole fraction of said additive metal in the +4 valence state is at least 0.25 percent relative to total metal in said semiconducting metal oxide composition.

3. The water treatment module of claim 2, wherein total mole fraction of said additive metal in said semiconducting metal oxide composition relative to total metal in said semiconducting metal oxide composition is between 1 and 50 percent, and mole fraction of said additive metal in the +4 valence state relative to total metal in said semiconducting metal oxide composition is at least 1 percent.

4. The water treatment module of claim 3 further provided with gas separating means.

5. The water treatment module of claim 2 further provided with turbulence promoting means.

6. The water treatment module of claim 2 further provided with a power supply module, wherein said power supply module includes periodic polarity reversing means.

7. The water treatment module of claim 2, wherein said array of said bipolar electrodes includes mounting gaskets having mounting windows containing said bipolar electrodes, and flow windows allowing flow of said electrically conductive aqueous medium through said array, and spacer gaskets maintaining proper separation between adjacent bipolar electrodes and retaining said bipolar electrodes in said mounting windows.

8. A water treatment device for decomposing chemical substances dissolved or dispersed in an electrically conductive aqueous medium, including at least one electrochemical cell, wherein said electrochemical cell includes at least one anode having a surface and a surface part and an internal part, wherein said surface part has a semiconducting metal oxide composition including an additive metal having valence states, wherein at least part of said additive metal is in a valence state which n-dopes said semiconducting metal oxide composition, and wherein concentration of platinum group metals in said semiconducting metal oxide composition is zero or too small to exert a significant electrocatalytic effect favoring the generation of oxygen, said semiconducting metal oxide composition contains titanium dioxide, and said additive metal is selected from the group consisting of Nb and Ta, and mole fraction of said additive metal in the +4 valence state is at least 0.25 percent relative to total metal in said semiconducting metal oxide composition, and wherein said water treatment device is further provided with a source of electric power, and water propulsion means for moving said electrically conductive aqueous medium through said water treatment device.

9. The water treatment device of claim 8, wherein said internal part of said anodes comprises a metallic substrate having a composition selected from the group consisting of titanium and titanium alloys, and total mole fraction of said additive metal in said semiconducting metal oxide composition relative to total metal in said semiconducting metal oxide composition is between 1 and 50 percent, and mole fraction of said additive metal in the +4 valence state relative to total metal in said semiconducting metal oxide composition is at least 1 percent.

10. The water treatment device of claim 8, further provided with water treatment means selected from the group consisting of water filtration means, oil-water separation means, heavy metal ion removal means, and chemical addition means.

11. The water treatment device of claim 8, wherein said electrochemical cell is a porous anode cell.

12. The water treatment device of claim 11, wherein said water treatment device is further provided with pressurization means allowing operation of said porous anode cell at pressure greater than atmospheric.

13. The water treatment device of claim 8, further provided with process control means, and effluent water quality monitoring means.

14. The water treatment device of claim 8, wherein said electrochemical cells are grouped into multiple treatment stages, whereby current density at said surfaces of said anodes within said cells within each of said treatment stages may be adjusted to optimize energy efficiency of said water treatment device.

15. The water treatment device of claim 14, further provided with chemical addition means and pH monitoring means, whereby pH of said electrically conductive aqueous medium can be maintained within a predetermined range beneficial to operation of said water treatment device.

16. The water treatment device of claim 15, wherein said electrochemical cells are selected from the class consisting of bipolar cells and porous anode cells.

17. The water treatment device of claim 16, wherein said internal part of said anodes comprises a metallic substrate having a composition selected from the class consisting of titanium and titanium alloys, and total mole fraction of said additive metal in said semiconducting metal oxide composition relative to total metal in said semiconducting metal oxide composition is between 1 and 50 percent, and mole fraction of said additive metal in the +4 valence state relative to total metal in said semiconducting metal oxide composition is at least 1 percent.

18. The water treatment device of claim 17, additionally provided with temperature regulating means, whereby temperature of said aqueous electrically conductive medium can be maintained in a predetermined range beneficial to operation of said water treatment device, and whereby heat generated by operation of said water treatment device can be recovered from said electrically conductive aqueous medium exiting said water treatment device.

19. The water treatment device of claim 17, wherein mole fraction of said additive metal in the +4 valence state in said semiconducting metal oxide composition is between two to six percent relative to total metal in said semiconducting oxide composition.

* * * * *